US006843123B2

(12) United States Patent
Tokuhisa et al.

(10) Patent No.: US 6,843,123 B2
(45) Date of Patent: Jan. 18, 2005

(54) FLOW RATE SENSOR, FLOW RATE MEASURING DEVICE, AND FLOW RATE CONTROL DEVICE

(75) Inventors: Yasukazu Tokuhisa, Kuwana (JP); Makoto Tanaka, Yokkaichi (JP)

(73) Assignee: Hitachi Metals Ltd., Tokyo (JP)

( * ) Notice: Subject to any disclaimer, the term of this patent is extended or adjusted under 35 U.S.C. 154(b) by 0 days.

(21) Appl. No.: 10/622,457

(22) Filed: Jul. 21, 2003

(65) Prior Publication Data

US 2004/0194544 A1 Oct. 7, 2004

(30) Foreign Application Priority Data

Jul. 23, 2002 (JP) ........................... 2002-214416
Mar. 31, 2003 (JP) ........................... 2003-096468

(51) Int. Cl.$^7$ ............................... G01F 1/68
(52) U.S. Cl. .................................. 73/204.27
(58) Field of Search ................. 73/204.27, 204.26, 73/204.25, 204.15, 204.23

(56) References Cited

U.S. PATENT DOCUMENTS 4,519,246 A * 5/1985 Hartemink ................. 73/202.5
4,877,051 A * 10/1989 Day ........................... 137/486
5,410,912 A   5/1995 Suzuki
6,085,588 A * 7/2000 Khadkikar et al. ........ 73/204.27
6,125,695 A * 10/2000 Alvesteffer et al. ....... 73/204.27
6,446,504 B1 * 9/2002 Maginnis, Jr. ............ 73/204.27

FOREIGN PATENT DOCUMENTS

JP      01-227016 A       9/1989

* cited by examiner

*Primary Examiner*—Edward Lefkowitz
*Assistant Examiner*—Jewel V. Thompson
(74) *Attorney, Agent, or Firm*—Sughrue Mion, PLLC

(57) ABSTRACT

A flow rate sensor capable of increasing a range where fluid flow rate can be detected with a high accuracy. The flow rate sensor includes: a sensor pipe; a resistor group; a reference resistor group; a constant current source; a first differential circuit; and a flow rate decision unit. The flow rate sensor further includes: a dummy sensor pipe where no fluid is flown; a dummy resistor group changing their resistance value according to the temperature and attached in the longitudinal direction, a dummy reference resistor group, a for-dummy constant current source, switch means for selectively connecting the resistor group with the dummy resistor group in series, a flow rate range increasing differential circuit for detecting a potential difference, and a third flow rate decision unit for obtaining the flow rate of the fluid flowing in the fluid passage according to the potential difference.

33 Claims, 18 Drawing Sheets

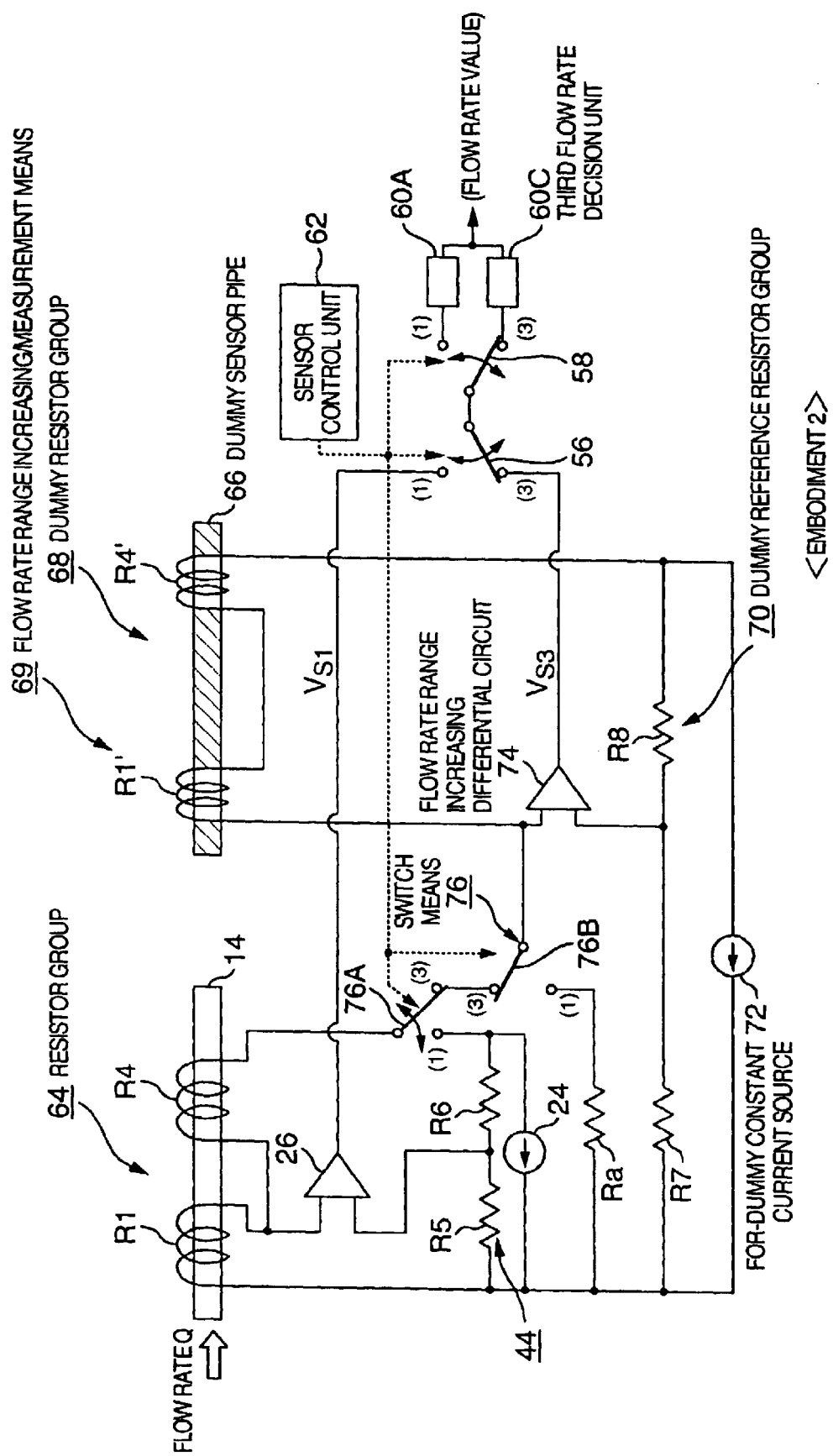

<MODIFIED EXAMPLE OF SECOND EMBODIMENT>

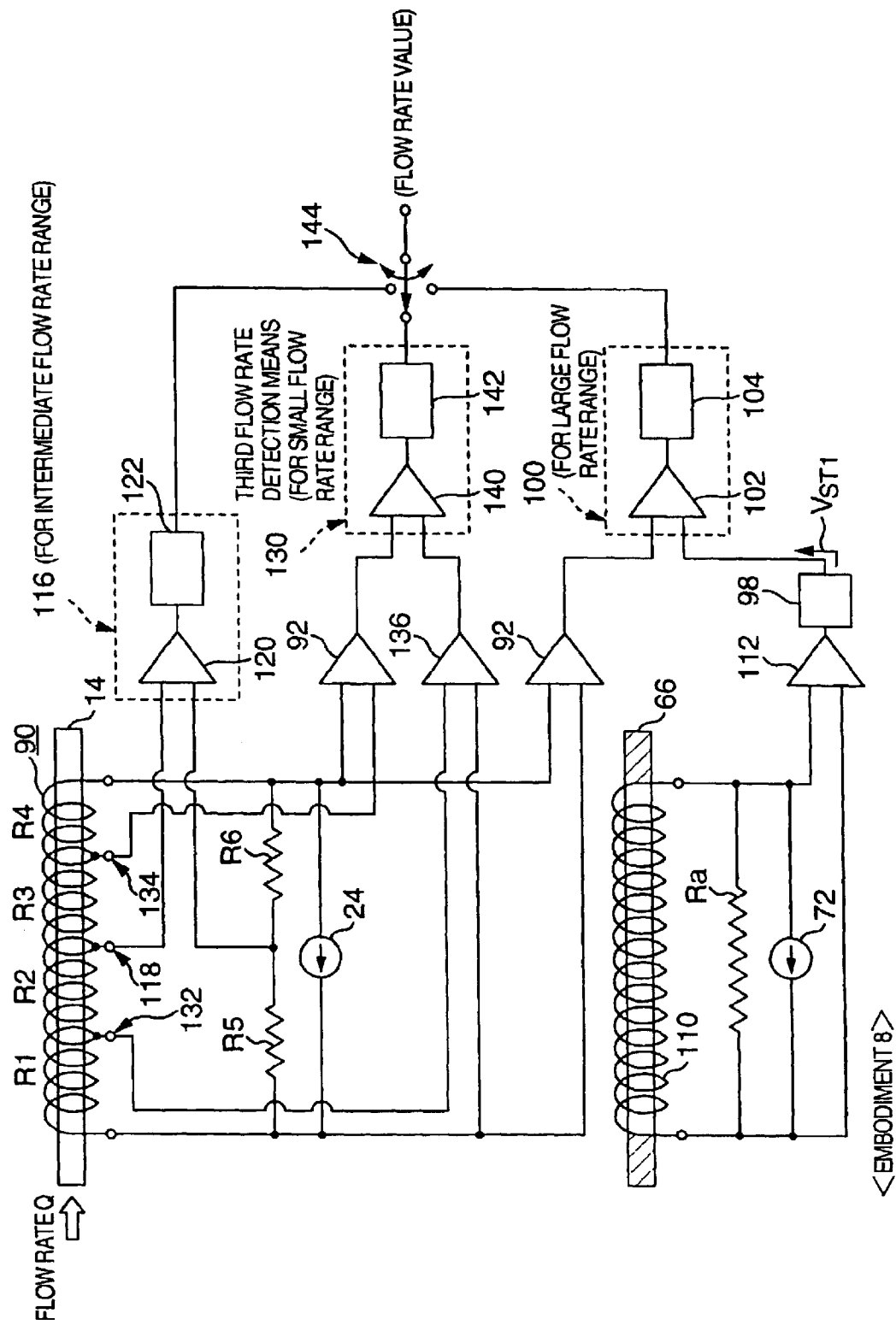

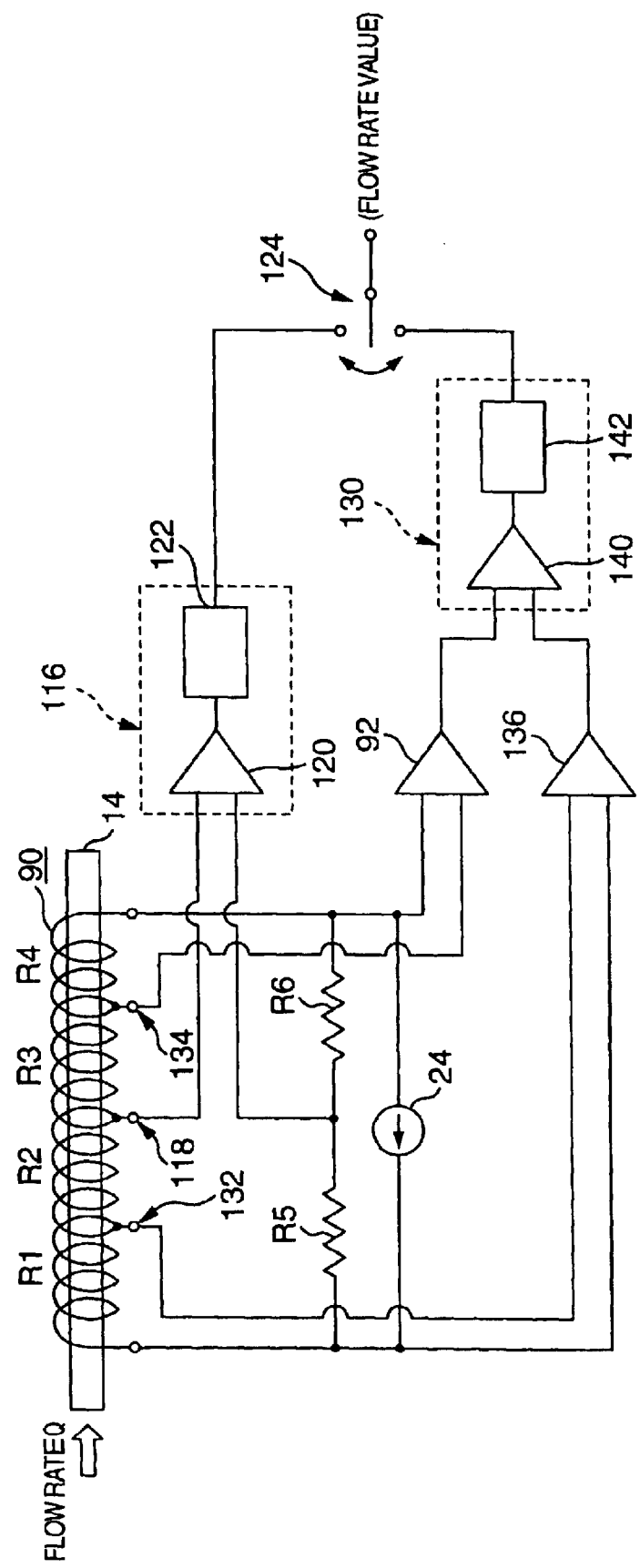

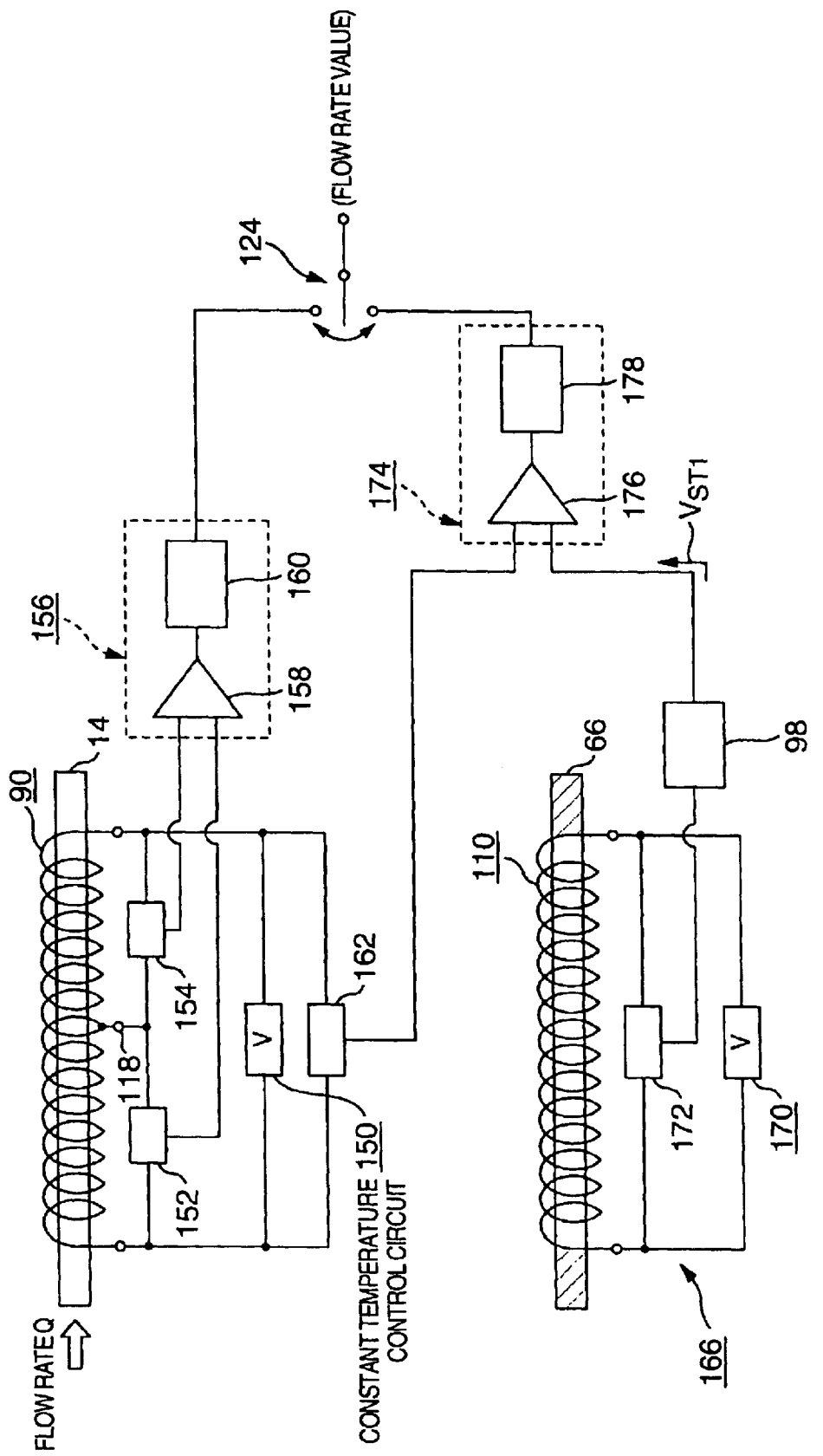

FLOW RATE SENSOR, FLOW RATE MEASURING DEVICE, AND FLOW RATE CONTROL DEVICE

BACKGROUND OF THE INVENTION

The present invention relates to a flow rate sensor, a flow rate measuring device, and a flow rate control device for measuring a flow rate of a comparatively small flow rate of fluid such as gas.

In general, when producing a semiconductor product such as a semiconductor integrated circuit, for example, CVD film formation and etching are repeatedly performed in various semiconductor manufacturing devices. In this case, it is necessary to accurately control the very small processing gas flow rate. For example, a flow rate control device such as a mass flow controller is used.

This type of flow rate control device can accurately control a very small flow rate (mass flow rate) of fluid such as gas. However, the range of the accurately controllable flow rate is comparatively small and is decided during a manufacturing stage by design. For example, a flow rate control device designed for accurately controlling flow rate in a small flow rate range such as 0 to 5 sccm cannot be used for a range of, for example, 100 sccm. On the contrary, a flow rate control device designed for accurately controlling the flow rate of a large flow rate range such as 100 sccm cannot function correctly in the small flow rate range such as 5 sccm.

Accordingly, when using the aforementioned flow rate control device in a gas piping of a semiconductor manufacturing device, it is necessary to select a flow rate control device designed to function accurately in a flow rate range corresponding to the gas flow rate in the piping as is disclosed, for example, in U.S. Pat. No. 5,410,912 and JP-A-1-227016.

Here, explanation will be given on configuration of an ordinary flow rate control device with reference to FIG. 17 and FIG. 18. FIG. 17 shows configuration of a flow rate control device arranged on a gas piping and FIG. 18 shows a flow rate sensor of the flow rate control device.

As shown in the figures, this flow rate control device 2 is arranged in the middle of a gas piping 4, for example, so as to regulate its flow rate. The flow rate control device 2 has a fluid passage 6 made from, for example, stainless steel and its both ends are connected to the gas piping 4. The flow rate control device 2 has a flow sensor 5 positioned at the front stage of the flow passage 6 and a flow rate control system 7 positioned at the rear stage.

Firstly, the flow rate sensor 5 has a bypass 8 arranged at the upstream side of the gas fluid flow direction of the flow passage 6 for flowing most of the flow amount. The both ends of the bypass 8 are connected to a sensor pipe 14 taking a roundabout route, so that a small amount of gas fluid as compared to the bypass 8 flows at a constant ratio. A pair of resistors R1 and R4 connected in series is wound around the sensor pipe 14, so as to obtain a detection value (potential difference) Vs by a sensor circuit 16 connected to this.

This detection value Vs is supplied to a flow rate control unit 18 composed of a microcomputer or the like, for example. According to the detection value Vs, the currently flowing gas rate is calculated and the fluid control system 7 is controlled so that the flow rate is matched with an instruction value S1 supplied from outside.

This fluid control system has a flow rate control valve 12 arranged at the downstream side of the fluid passage 6. This flow rate control valve 12 has diaphragm, for example, as a valve body for directly controlling the flow rate of the gas fluid. The diaphragm 10 can adjust its valve open degree by an actuator 20 composed of, for example, a laminated piezoelectric element. In response to a signal from the flow rate control unit 18, the actuator 20 is operated by a drive signal output from a drive unit 22.

FIG. 18 shows the relationship between the resistors R1, R4 and the sensor circuit 16. That is, with respect to the resistors R1 and R4 connected in series, a circuit of two reference resistors R5 and R6 connected in series is connected in parallel, thereby forming a so-called bridge circuit. A constant current source 24 is connected to this bridge circuit so as to flow a constant current. Moreover, a connection point between the resistors R1 and R4 and a connection point between the reference resistors R5 and R6 are connected to the input side and a differential circuit 26 is provided. A difference between the potentials of the two connection points is obtained and this potential difference is output as the detection value Vs.

Here, the aforementioned resistors R1 and R4 are made from a material changing its resistance value according to the temperature and its heat value according to the current. The resistor R1 is wound at the upstream side of the gas flow direction and the resistor R4 is wound at the downstream side. Moreover, the reference resistors R5 and R6 are maintained substantially at a constant temperature.

In the flow rate control device 2 having the aforementioned configuration, when no gas fluid is flowing in the sensor pipe 14, the temperature values of the resistors R1 and R4 are identical. Accordingly, the bridge circuit is balanced and the potential difference as a detection value of the differential circuit 26 is, for example, zero.

When it is assumed that a gas fluid flows in the sensor pipe 14 with a flow rate Q, the gas fluid is heated by the heat value of the resistor R1 located at the upstream side and flows as it is to the position of the resistor R4 at the downstream side. As a result, heat movement is caused, resulting in a temperature difference between the resistors R1 and R4, i.e., resistance difference between the resistors R1 and R4. The potential difference generated here is substantially proportional to the gas flow rate. Accordingly, by multiplying this detection value Vs by a predetermined gain, it is possible to obtain the gas flow rate then. Moreover, the valve open degree of the flow rate control valve 12 is controlled so that the gas flow rate detected is matched with the instruction value S1 (actually, voltage value). Moreover, the relationship between the gas flow rate and the potential difference as the detection value has excellent proportional linearity at first and in a range that can be used for flow rate control.

However, as the potential difference increases, saturation is caused and the range cannot be used for flow rate control. Accordingly, various types of flow rate control devices are prepared by modifying the gain value to be multiplied to the detection value Vs and the resistance values of the resistors R1 and R4, so that flow rate control devices having different ranges for appropriately measuring the gas flow rate are available.

Next, explanation will be given on a semiconductor manufacturing device using the flow rate control device having the aforementioned configuration with reference to FIG. 19. Here, an example is given for supplying the same gas at different flow rates.

As shown in the figure, this semiconductor manufacturing device has a treatment chamber 30 capable of being vacuumed. A gas source 32 is connected to the treatment chamber 30 via a gas pipe 4. This gas pipe 4 is branched to two different routes of gas pipes 4A and 4B. The gas pipe 4A and 4B have flow rate control devices 2A, 2B and open/close valves 34, 36, respectively. For example, according to an instruction from an device control unit 38 composed of a microcomputer, the flow rate control devices 2A and 2B are selectively operated. For example, one of the flow rate control devices 2A is set for a large flow rate and the other flow rate control device 2B is set for a small flow rate. Accordingly, as shown in FIG. 19, when gas is to be flown at a large flow rate at the beginning of the treatment and after this, gas is to be flown at a small flow rate, control is made sop that the flow rate control device 2A for a large flow rate is operated firstly and after this the flow rate control device 2B for a small flow rate is operated.

As has been explained with reference to FIG. 19 and FIG. 20, in the flow rate control device having the aforementioned configuration, when the same gas should be supplied in ranges of greatly different flow rates, a plurality of flow rate control devices 2A, 2B designed for the different ranges of gas flow rate should be used. This increases the facility cost. Moreover, when arranging flow rate control devices of different flow rate ranges, it is necessary to have a corresponding space and it is difficult to provide an additional device.

Moreover, in the structure of the gas pipe 4 shown in FIG. 19, when switching between the gas flow rates, it is necessary to perform open/close switching of the open/close valves 34, 36. Here, in order to prevent a sudden gas flow stop or a sudden flow start, the valve open/close switching operation requires a certain time, which increases the wafer treatment time, thereby lowering the throughput.

SUMMARY OF THE INVENTION

It is therefore an object of the present invention to provide a flow sensor and a flow rate measuring device capable of increasing the range for accurately detecting the fluid flow rate.

Another object of the present invention is provide a flow rate control device capable of increasing the range for accurately controlling the fluid flow rate.

Still another object of the present invention is to provide a flow sensor and a flow rate control device capable of accurately detecting a flow rate in the vicinity of the maximum flow rate range in the fluid flow rate control range (full scale).

According to an aspect of the present invention, there is provided a flow rate sensor comprising: a sensor pipe arranged in parallel to a bypass of a fluid passage; a resistor group spirally wound around the sensor pipe and consisting of an even number of resistors having a resistance value changing according to the temperature and connected in series in the longitudinal direction of the sensor pipe; a reference resistor group consisting of a plurality of reference resistors connected in series to one another and connected in parallel to the aforementioned resistor group; a constant current source for flowing a constant current to the resistor group and the reference resistor group; a first differential circuit for detecting a potential difference between a connection point between the reference resistors and a connection point between the resistors; and a flow rate decision unit for deciding a flow rate of a fluid flowing in the fluid passage according to the potential difference output from the first differential circuit; the flow rate sensor further comprising: at least one bypass circuit having switch means for selectively shortcircuiting a part of the even number of resistors so as to perform bypassing; at least one flow rate range increasing differential circuit for detecting a potential difference between the bypass circuit and the connection point between the reference resistors; and a second flow rate decision unit for detecting the flow rate of the fluid flowing in the fluid passage according to the potential difference output from the flow rate range increasing differential circuit.

In this case, for example, there are provided four of the resistors and two of the reference resistors, and the bypass circuit bypasses the two resistors connected in series at the center.

According to another aspect of the present invention, there is provided a flow rate sensor comprising: a sensor pipe arranged to bypass a bypass of a fluid passage; a resistor group consisting of an even number of resistors having a resistance value changing according to the temperature, connected in series in the longitudinal direction of the sensor pipe, and mounted on the sensor pipe; a reference resistor group consisting of a plurality of reference resistors connected in series to one another and connected in parallel to the aforementioned resistor group; a constant current source for flowing a constant current to the resistor group and the reference resistor group; a first differential circuit for detecting a potential difference between a connection point between the reference resistors and a connection point between the resistors; and a flow rate decision unit for deciding a flow rate of a fluid flowing in the fluid passage according to the potential difference output from the first differential circuit; the flow rate sensor further comprising flow rate range increasing measurement means for increasing the flow rte range; the flow rate range increasing measurement means having: a dummy sensor pipe where no fluid is flown; a dummy resistor group consisting of one or more dummy resistors having a resistance value changing according to the temperature and mounted in the longitudinal direction of the dummy sensor; a dummy reference resistor group connected between the downstream side of the dummy resistor group and the upstream side of the resistor group and consisting of a plurality of dummy reference resistors connected in series; a for-dummy constant current source connected to the both ends of the dummy reference resistor group for flowing a constant current; switch means for selectively connecting in series the resistor group and the dummy resistor group; a flow rate range increasing differential circuit for detecting a potential difference between the input side of the dummy resistor group and the connection point between the dummy reference resistors; and a third flow rate decision unit for detecting the flow rate of the fluid flowing in the fluid passage according to the potential difference output from the flow rate range increasing differential circuit.

In this case, for example, there is provided a flow rate sensor comprising a flow rate sensor and flow rate range increasing measurement means disclosed as mentioned above.

In this case, for example, the sensor further comprises: a first switch for selecting a connection point between the resistors and a second switch for selecting a connection point between the dummy reference resistors.

According to other aspect of the present invention, there is provided a flow rate sensor comprising: a sensor pipe connected in parallel to a bypass of a fluid passage; a main resistor wound on the sensor pipe and changing its resistance value according to the temperature and heat value according to the current; a constant current source for flowing a constant current to the main resistor; reference value detection means capable of obtaining a reference value according to the ambient temperature; and first flow rate detection means for detecting the flow rate of the fluid flowing in the fluid passage according to the voltage applied to both ends of the main resistor and the reference value obtained by the reference value detection means.

In this case, for example, the reference value detection means comprises: a dummy sensor pipe where no fluid is flown; a for-dummy resistor wound on the dummy sensor pipe and changing its resistance value according to the temperature and its heat value according to the current flowing; a for-dummy constant current source for flowing a constant current to the for-dummy resistor; and a for-dummy voltage detection unit for detecting voltage at both ends of the for-dummy resistor so as to serve as the reference value.

Moreover, for example, the reference value detection means has a coefficient matching unit for matching the resistance temperature coefficients of the main resistor and the for-dummy resistor.

Moreover, for example, the reference value detection means has one of a thermistor, a thermocouple, and a temperature measuring resistor for detecting the ambient temperature as a voltage value.

Moreover, for example, the reference value detection means has a coefficient matching unit for matching the ambient temperature characteristic of the voltage value detected according to the ambient temperature with the ambient temperature characteristic of the voltage at both ends of the main resistor when no fluid is flown through the sensor pipe.

Moreover, for example, the reference value detection means stores a voltage at both ends of the main resistor before starting flow of the fluid in the sensor pipe, so as to use the stored value as the reference value.

Moreover, for example, the sensor further comprises: a middle terminal for extracting voltage at an arbitrary position of the main resistor; second flow rate detection means for detecting the flow rate of the fluid flowing in the fluid passage by calculating the difference between the voltage of the upstream side of the main resistor as compared to the middle terminal and the voltage of the downstream side of the main resistor as compared to the middle terminal; and switch means for switching between the output of the second flow rate detection means and the output of the first flow rate detection means.

Moreover, for example, the sensor further comprises: an upstream side terminal arranged at an arbitrary point between the upstream side end of the main resistor and the middle terminal; a downstream side terminal arranged at an arbitrary position between the downstream side end of the main resistor and the middle terminal; third flow rate detection means for detecting the flow rate of the fluid flowing in the fluid passage by calculating the difference between the voltage between the upstream side end and the upstream side terminal and the voltage between the downstream side end and the downstream side terminal; and switch means for selectively switching between the outputs of the first, the second, and the third flow rate detection means.

Moreover, for example, each of the flow rate detection means has a flow rate calculation unit for adjusting a gain.

According to the other aspect of the present invention, there is provided a flow rate sensor comprising: a sensor pipe arranged in parallel to a bypass of a fluid passage; a main resistor wound on the sensor pipe and changing its resistance value according to the temperature and its heat value according to the current; a constant current source for flowing a constant current to the main resistor; a middle terminal for extracting voltage at an arbitrary position of the main resistor; second flow rate detection means for obtaining the flow rate of the fluid flowing in the fluid passage by calculating the difference between the voltage of the upstream side of the main resistor as compared to the middle terminal and the voltage of the downstream side of the main resistor as compared to the middle terminal; an upstream side terminal arranged at an arbitrary point between the upstream side end of the main resistor and the middle terminal; a downstream side terminal arranged at an arbitrary point between the downstream side end of the main resistor and the middle terminal; third flow rate detection means for obtaining the flow rate of the fluid flowing in the fluid passage by calculating the difference between the voltage between the upstream side end and the upstream side terminal and the voltage between the downstream side end and the downstream side terminal; and switch means for selectively switching between the outputs of the second and the third flow rate detection means.

According to the other aspect of the present invention, there is provided a flow rate sensor comprising: a sensor pipe arranged in parallel to a bypass of a fluid passage; a main resistor wound on the sensor pipe and changing its resistance value according to the temperature and its heat value according to the current; a constant temperature control circuit for maintaining the temperature of the main resistor and the difference between the temperature and the ambient temperature to be constant; a middle terminal for extracting voltage at an arbitrary position of the main resistor; fourth flow rate detection means for obtaining the flow rate of the fluid flowing in the fluid passage by calculating the difference between the upstream side power applied to the upstream side of the main resistor as compared to the middle terminal and the downstream side power applied to the downstream side of the main resistor as compared to the middle terminal; reference value detection means capable of detecting a reference value according to the ambient temperature; fifth flow rate detection means for obtaining the flow rate of the fluid flowing in the fluid passage according to all the power applied to the main resistor and the reference value obtained by the reference value detection means; and switch means for selectively switching between the outputs of the fourth and the fifth flow rate detection means.

In this case, for example, the reference value detection means comprises: a dummy sensor pipe where no fluid is flown; a for-dummy resistor wound on the dummy sensor pipe and changing its resistance value according to the temperature and its heat value according to the current flowing; a for-dummy constant temperature control circuit for maintaining the temperature of the for-dummy resistor or the difference between the temperature and the ambient temperature to be constant; a for-dummy power detection unit for detecting power applied to the for-dummy resistor so as to serve as the reference value.

Moreover, for example, the reference value detection means stores all the power applied to the main resistor before start of flowing of the fluid in the sensor pipe and uses the stored value as the reference value.

Moreover, for example, each of the fourth and the fifth flow rate detection means has a flow rate calculation unit for adjusting the gain.

Moreover, for example, the flow rate calculation units have different gains so that the flow rate control characteristic has a discontinuity point or a flexion point according to switching of the switch means.

Moreover, for example, the flow rate calculation unit has a gain exhibiting LOG characteristic.

According to the other aspect of the present invention, there is provided a flow rate measuring device comprising a flow rate sensor as mentioned above and a display unit displaying a flow rate obtained by the flow rate sensor.

According to the other aspect of the present invention, there is provided a flow rate control device comprising: a flow rate sensor as mentioned above; a flow rate control valve provided in a fluid passage; and an actuator controlling valve opening degree of the flow rate control valve according to an output value of the flow rate sensor.

Other objects, features and advantages of the invention will become apparent from the following description of the embodiments of the invention taken in conjunction with the accompanying drawings.

BRIEF DESCRIPTION OF THE DRAWINGS

FIG. 3 is a circuit diagram showing an essential portion of a flow rate sensor according to a second embodiment of the present invention.

FIG. 13 is a circuit diagram showing an essential portion of a flow rate sensor according to an eighth embodiment of the present invention.

FIG. 14 is a circuit diagram showing an essential portion of a flow rate sensor according to a ninth embodiment of the present invention.

FIG. 15 is a circuit diagram showing an essential portion of a flow rate sensor according to a tenth embodiment of the present invention.

DESCRIPTION OF THE EMBODIMENTS

Description will now be directed to a flow sensor, a flow rate measuring device, and a flow rate control device according to an embodiment with reference to the attached drawings.

Figure 1:
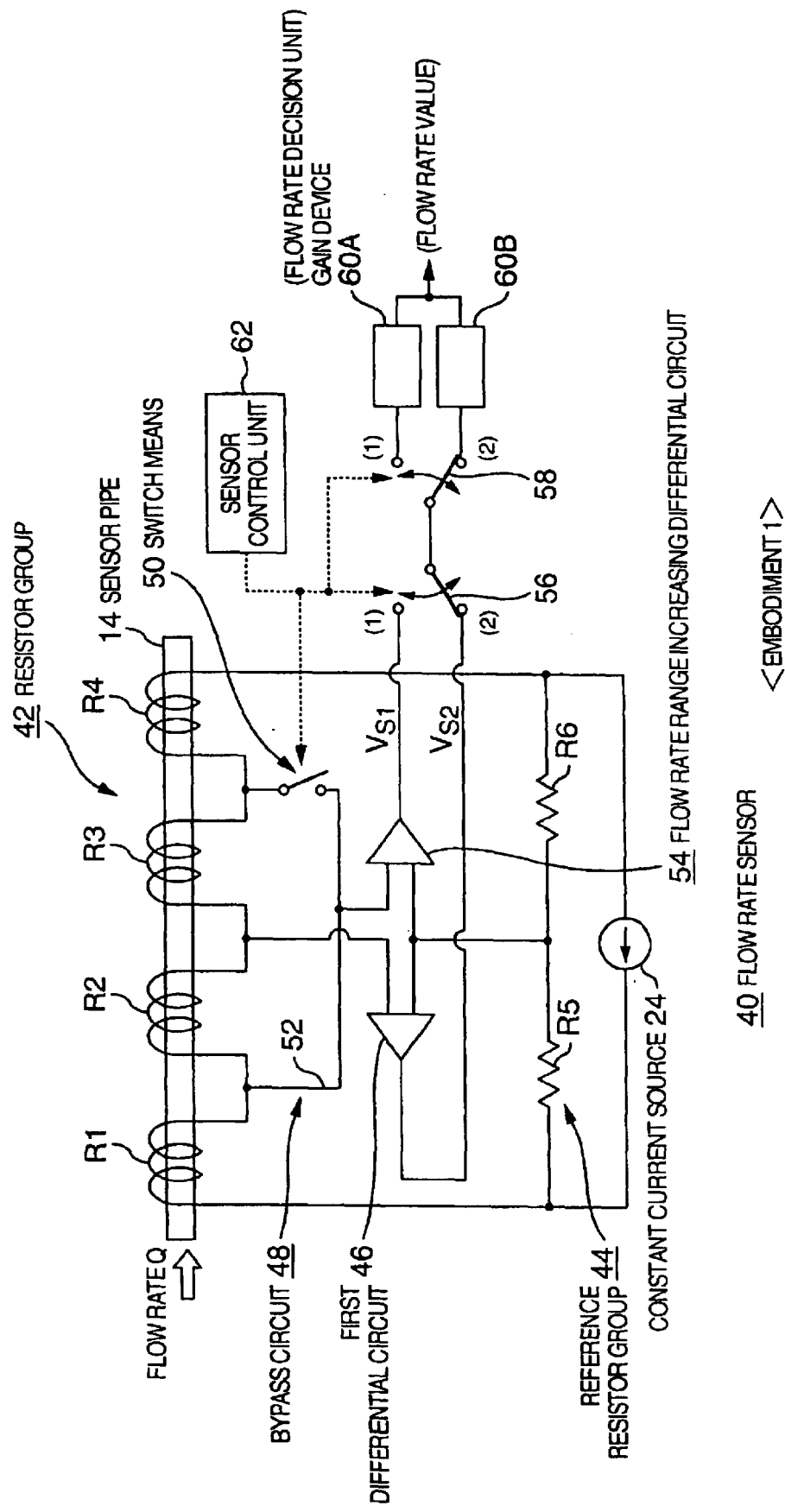
FIG. 1 is a circuit diagram showing an essential portion of a flow rate sensor according to a first embodiment of the present invention.
Figure 17:
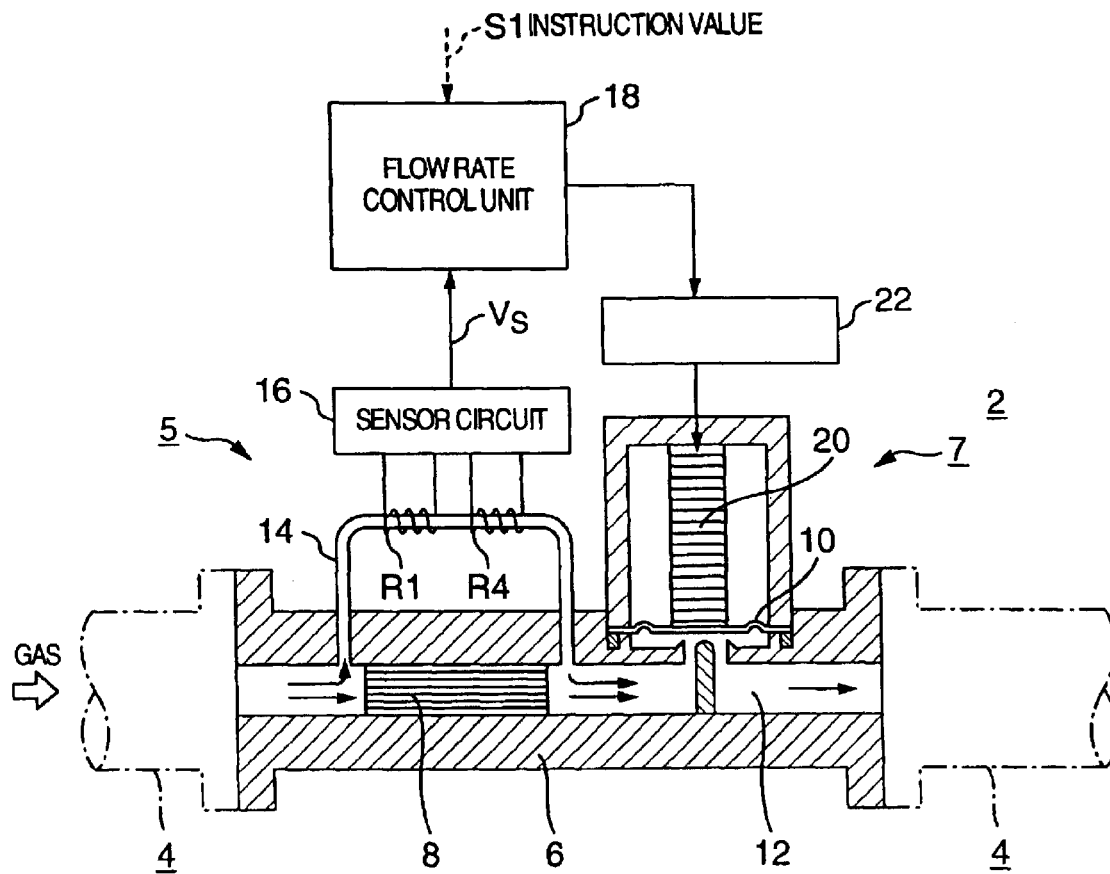
FIG. 17 shows an outline of configuration of a conventional flow rate control device arranged on a gas pipe.
Figure 18:
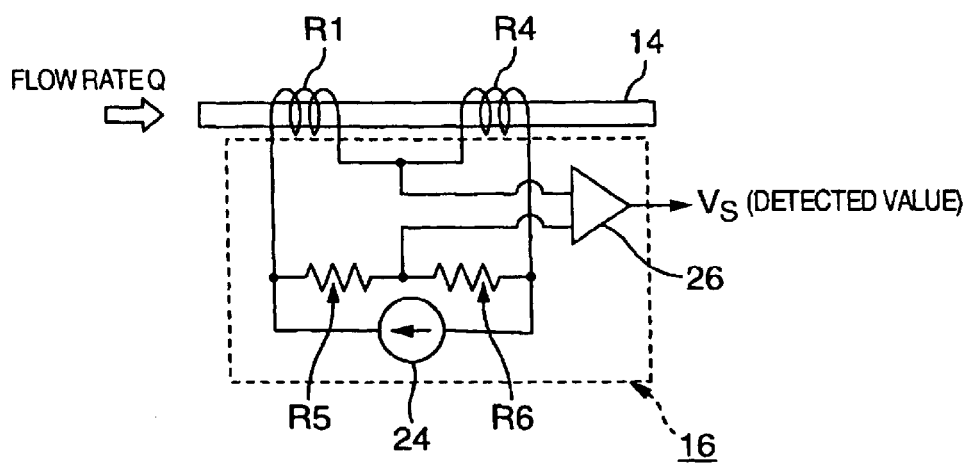
FIG. 18 is a circuit diagram showing a conventional flow sensor of a flow rate control device.
Figure 19:
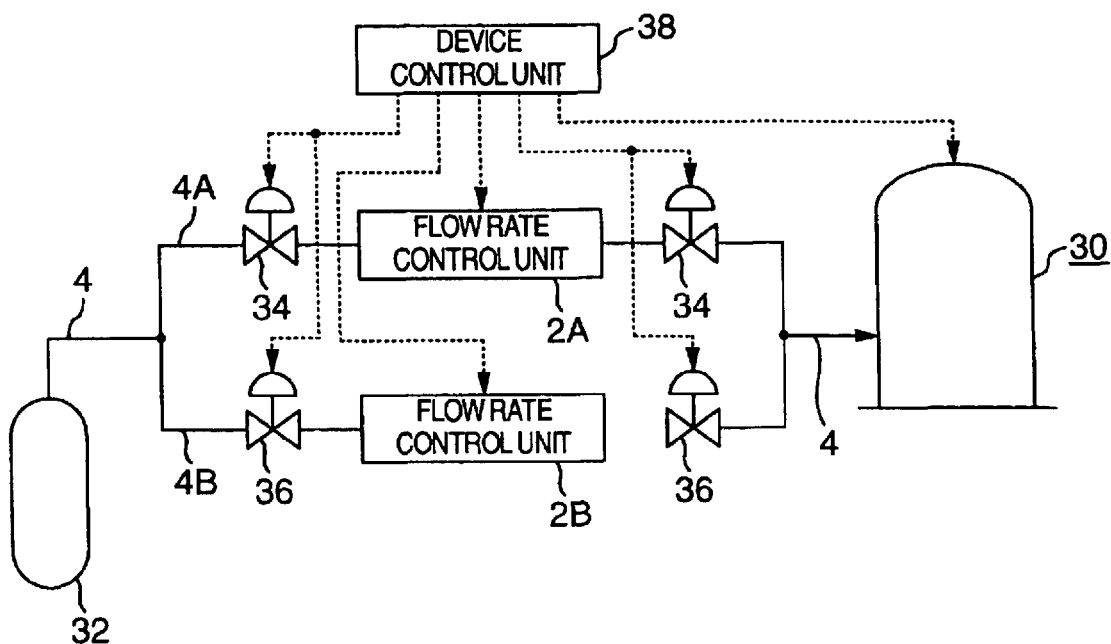
FIG. 19 shows a structure of a gas pipe of a conventional semiconductor manufacturing device.
Figure 20:
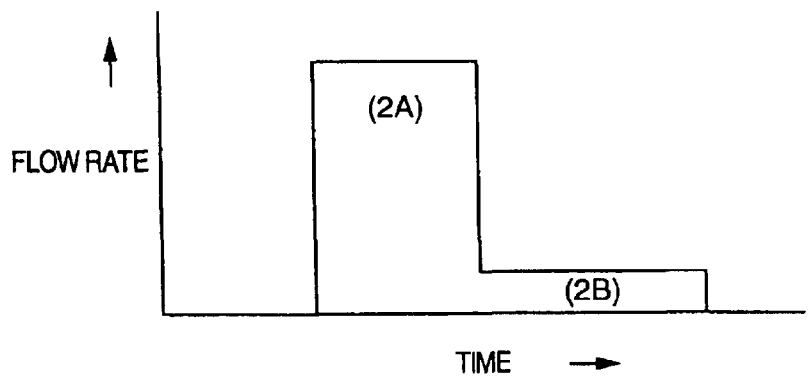
FIG. 20 is a graph showing a change of the gas flow rate.

FIG. 1 is a circuit diagram showing an essential portion of a flow rate sensor according to a first embodiment of the present invention. It should be noted that like components as in FIG. 17 and FIG. 18 are denoted with like reference symbols. Moreover, the term "small flow rate", "intermediate flow rate", and "large flow rate" do not indicate absolute flow rates but simply relative flow rates.

This flow rate sensor 40 corresponds to the flow rate sensor 5 provided in the flow rate control device 2 shown in FIG. 1. In FIG. 1, the fluid passage 6 and the bypass 8 arranged on it are omitted.

As shown in the figure, a resistor group 42 consisting of an even number of resistors (four in this example) R1, R2, R3, and R4 connected in series in this order is wound on the sensor pipe 14 made from a thin pipe of, for example, stainless steel. Each of the resistors R1, R2, R3, and R4 changes its resistance according to the temperature and heat value according to the current. In this case, the resistor R1 is located at the most upstream side.

Moreover, the resistor group 42 is connected in parallel to a reference resistor group 44 consisting of two reference resistors R5 and R6 connected in series. It should be noted that for easy understanding of the invention, it is assumed that the resistors R1 to R4 and R5, R6 at the room temperature have the same resistance value.

The resistor group 42 and the reference resistor group 44 are connected to a constant current source 24 for applying a constant current. Moreover, a first differential circuit 46 is provided for acquiring voltage from the connection point between the two resistors R2 and R3 and the connection point between the reference resistors R5 and R6 and comparing them to obtain a potential difference $Vs_2$ between the connection points.

Figure 9:
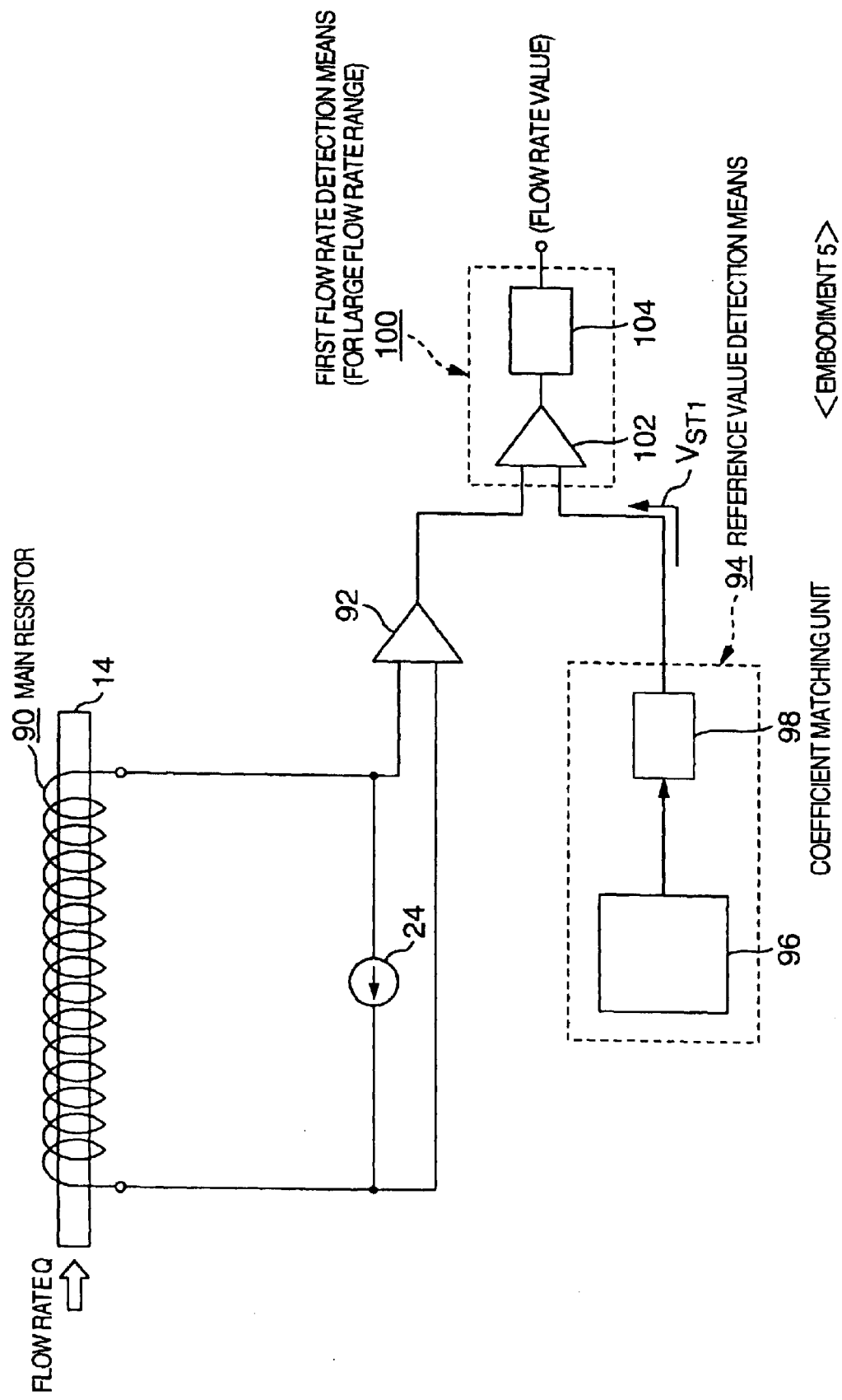
FIG. 9 is a circuit diagram showing an essential portion of a flow rate sensor according to a fifth embodiment of the present invention.

Moreover, a bypass circuit 48 is provided for short-circuiting the connection point between the two resistors R1 and R2 at the upstream side and the connection point between the two resistors R3 and R4 at the downstream side. More specifically, this bypass circuit 48 includes a line 52 having open/close switch means 50 in the middle. When necessary, the switch means 50 is opened/closed for short-circuiting so as to directly connect the resistor R1 at the uppermost side with the resistor R4 at the lowermost side. It should be noted that connection of the resistors upon short-circuiting is the same as shown in FIG. 9.

A flow-rate-range-increasing differential circuit 54 is provided for acquiring voltage from the bypass circuit 48 and the connection point between the reference resistors R5 and R6 and comparing them so as to obtain a potential difference $Vs_1$ of the voltages.

The potential differences $Vs_2$ and $Vs_1$ as outputs of the differential circuits 46, 54 are switched by an output selector switch 56 and selectively output. It should be noted that the configuration explained up to now corresponds to the sensor circuit 16 in FIG. 9.

Next, the output of the output selector switch 56 is supplied to a gain selector switch 58 switched in synchronization with the output selector switch 56, thereby selecting a gain device (first flow rate decision unit) 60A and a gain device (second flow rate decision unit) 60B for applying a gain corresponding to a flow rate to be measured. By multiplying the potential difference to be input by the gains of the gain devices 60A and 60B, it is possible to obtain the flow rate value of the gas fluid.

Thus, by changing the gain to be multiplied on the potential difference which is output, it is possible to accurately measure a gas flow rate in different flow rate ranges.

The aforementioned switch means 50 and switches 56, 58 are controlled by a sensor control unit 62 composed of a microcomputer, for example, for controlling the operation of the entire sensor.

Figure 2:
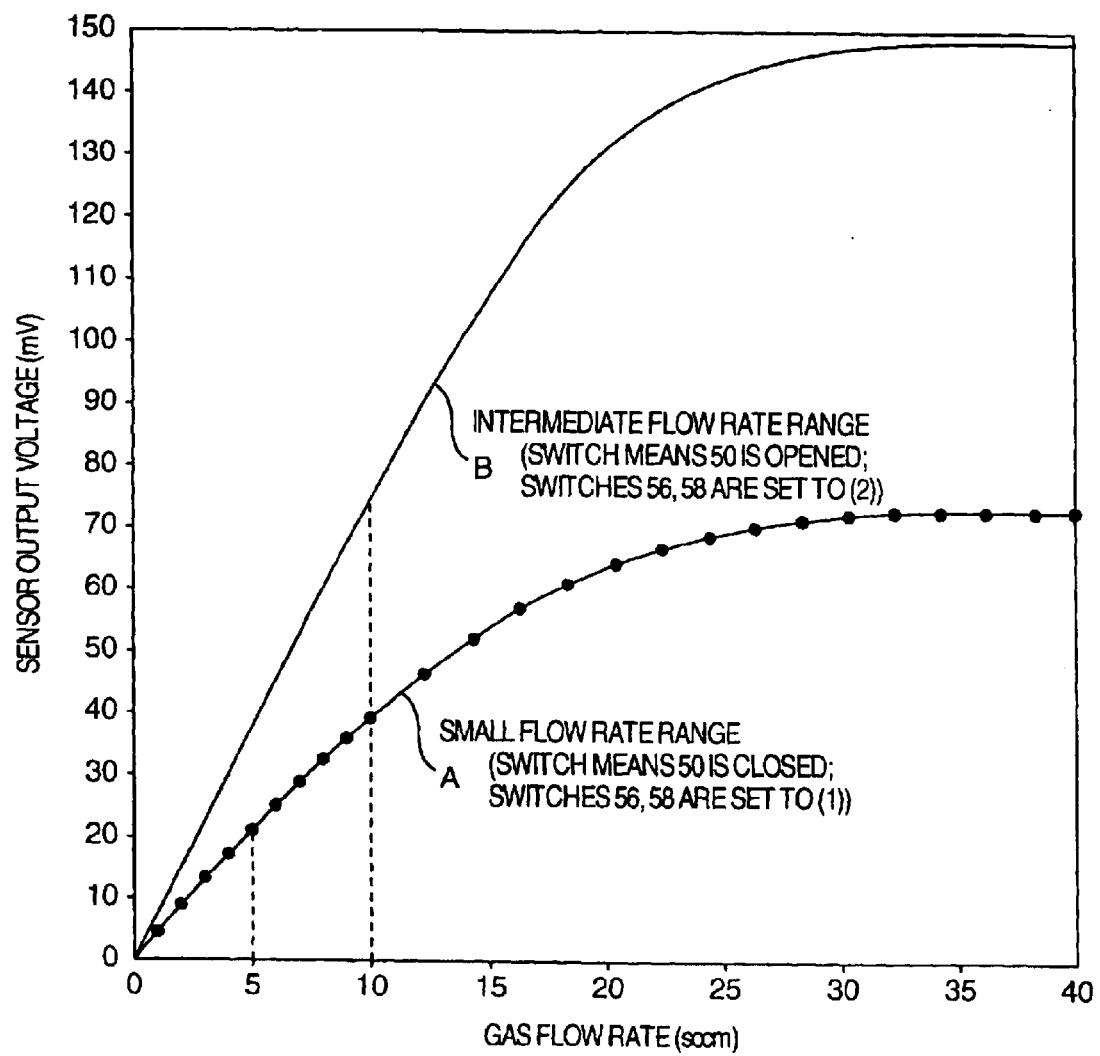
FIG. 2 is graph showing the relationship between a gas flow rate and sensor output voltage (potential difference) in the first embodiment.

Next, explanation will be given on the operation of the sensor with reference to a graph of FIG. 2. FIG. 2 is a graph showing the relationship between the gas flow rate and the sensor output voltage (potential difference) according to a first embodiment. It should be noted that the number (1) to (4) attached to the switches in the first embodiment and after denote that the switches are switched to the side of the same number.

<Small Flow Rate Rage>

Firstly, explanation will be given on flow rate detection in a small flow rate range (for example, in the order of 0 to 5 sccm) of the gas flow rate.

In this case, the switch means 50 of the bypass circuit 48 is closed and the output selector switch 56 and the gain selector switch 58 are switched to the side (1). Thus, since the switch means 50 is closed, no current flows to the resistors R2, R3 while a constant current flows to the resistors R1 and R4. It should be noted that a constant current flows to the reference resistors R5, R6.

Accordingly, the circuit state here is identical to the circuit configuration explained with reference to FIG. 18. The voltage of the connection point between the resistors R1 and R4 and voltage of the connection point between the reference resistors R5 and R6 are compared by the flow-rate-range-increasing differential circuit 54 and the potential difference is output as the detection value $Vs_1$. This detection value $Vs_1$ is multiplied by a predetermined gain by the gain device 60A so as to obtain a flow rate value of the gas fluid at that time. The relationship between the gas flow rate and the sensor output (potential difference) is shown by a curve A in FIG. 2. The curve A firstly has an excellent linearity with respect to the sensor and increases from zero substantially proportionally to the sensor and then enters a saturated state. In this case, the especially preferable range of the characteristic linearity is the first half of the curve A, which corresponds to a range in the order of 0 to 5 sccm as a gas flow rate. Accordingly, by measuring a gas flow rate making the range of 0 to 5 sccm as a full scale, it is possible to accurately measure the gas flow rate in this flow rate range.

<Intermediate Flow Rate Range>

Next, explanation will be given on the flow rate detection in the intermediate flow rate range (for example, 5 to 10 sccm) of the gas flow rate.

In this case, the switch means 50 of the bypass circuit 48 is opened and the output selector switch 56 and the gain selector switch 58 are both switched to the side (2). Since the switch means 50 is open, a constant current is supplied to all the resistors R1, R2, R3, and R4. It should be noted that a constant current flows to the reference resistors R5 and R6.

Accordingly, the switch state at this time is the state shown by a solid line in FIG. 1. The voltage of the connection point between the resistors R2 and R3 and the voltage of the connection point between the reference resistors R5 and R6 are compared by the first differential circuit 46 and the potential difference is output as the detection value $Vs_2$. By multiplying this detection value $Vs_2$ by a predetermined gain in the gain device 60B, it is possible to obtain a flow rate value of the gas fluid at that time. The relationship between the gas flow rate and the sensor output (potential difference) is shown by a curve B in FIG. 2. The curve B as a whole has a greater output than the curve A. The curve B firstly has an excellent linearity with respect to the sensor output and increases from zero substantially proportionally to the sensor output and then enters a saturated state. In this case, the especially preferable range of the characteristic linearity is the first half of the curve B, which corresponds to a range in the order of 0 to 10 sccm as a gas flow rate. Accordingly, by measuring a gas flow rate making the range of 0 to 10 sccm as a full scale, it is possible to accurately measure the gas flow rate in this flow rate range.

In this case, for the range of 0 to 5 sccm, it is possible to detect the gas flow rate more accurately by performing the gas flow rate measurement based on the curve A.

Thus, when a constant current is supplied to all the four resistors R1 to R4, the heat value as a whole becomes greater than the case when two resistors are used. Accordingly, even in the range of greater gas flow rate, it is possible to detect and measure the gas flow rate with a high accuracy. Consequently, even when performing a plurality of processes involving greatly different gas flow rates, it is possible to rapidly change the gas flow rate and rapidly perform the process.

Moreover, by not using some of the resistors among the resistors R1 to R4 as resistors for detection, it is possible to accurately detect and measure the gas flow rate even in a range of small gas flow rate. It should be noted that explanation has been given on the case that four resistors R1 to R4 are used. However, the invention is not limited to this. It is possible to connect greater even number of resistors in series and by performing the aforementioned switching operation, it is possible to detect the gas flow rate in a greater gas flow rate range.

<Embodiment 2>

Description will now be directed to a second embodiment.

FIG. 3 is a circuit diagram showing an essential portion of a flow rate sensor according to a second embodiment of the present invention. It should be noted that like components as in FIG. 1, FIG. 17, and FIG. 18 are denoted by like reference symbols and their explanations are omitted.

Here, in addition to the conventional flow rate sensor shown in FIG. 18, flow rate range increasing means 69 is provided. That is, the conventional flow rate sensor shown at left in the figure includes a resistor group 64 consisting of resistors R1 and R4 connected in series and wound on the sensor pipe 14, a reference resistor group 44 (see FIG. 1) consisting of reference resistors R5 and R6, a constant current source 24, and a differential circuit 26.

In contrast to this, the aforementioned flow rate range increasing means 69 includes a dummy sensor pipe 66 having the same configuration as the sensor pipe 14, for example. No fluid is flown to this dummy sensor pipe 66.

A dummy resistor group 68 changing its resistance value according to the temperature and heat value according to the current is mounted on the dummy sensor pipe 66 in the longitudinal direction of the dummy sensor pipe 66. Here, the dummy resistor group 68 includes one or more dummy resistors such as two in the example of the figure R1' and R4' connected in series in this order. It should be noted that the dummy resistors R1' and R4' may be replaced by one dummy resistor having the same resistance value as a whole.

The upstream side of the resistor group 64 is connected to the downstream side of the dummy resistor group 68 by a dummy reference resistor group 70 consisting of a plurality (two in the figure) of dummy reference resistors R7 and R8 connected in series in this order. Here, for easiness of understanding of the invention, it is assumed that the resistors R1, R4, R1', and R4' have the identical resistance value at the room temperature and the resistors R7 and R8 have the identical resistance value. The both ends of the dummy reference resistor group 70 are connected to a constant current source 72 for the dummy for applying a constant current. Moreover, a flow rate range increasing differential circuit 74 is connected for comparing the voltage of the input side of the dummy resistor group 68 and the voltage of the connection point between the dummy reference resistors R7 and R8. Here, the potential difference $Vs_3$ of the aforementioned voltages is obtained.

Moreover, between the resistor group 64 and the dummy resistor group 68, switch means 76 is connected so as to selectively connect them in series. More specifically, the switch means 76 is arranged at the output side of the resistor group 64 and consists of a first selector switch 76A for opening/closing this line and a second selector switch 76B connected to the input side of the dummy resistor group 68 and switching between the output side of the first selector switch 76A and a buffer resistor Ra connected to the input side of the dummy reference resistor group 70. Thus, when the both switches 76A and 76B are switched to the side (3) and the resistor group 64 is connected to the dummy resistor group 68 in series, the resistor groups 64, 68, and the dummy reference resistors R7, R8 constitute a bridge circuit. At the output side of the differential circuits 26, 74, as has been explained in FIG. 1, the output selector switch 56 and the gain selector switch 58 are arranged so that the gain device 60A and the gain device 60C as a third flow rate decision unit can be selected.

Here, the switches 56, 587, 76A, and 76B are operated by the sensor control unit 62 controlling the entire sensor.

Next, explanation will be given on the operation of the aforementioned sensor with reference to a graph of FIG. 4.

Figure 4A:
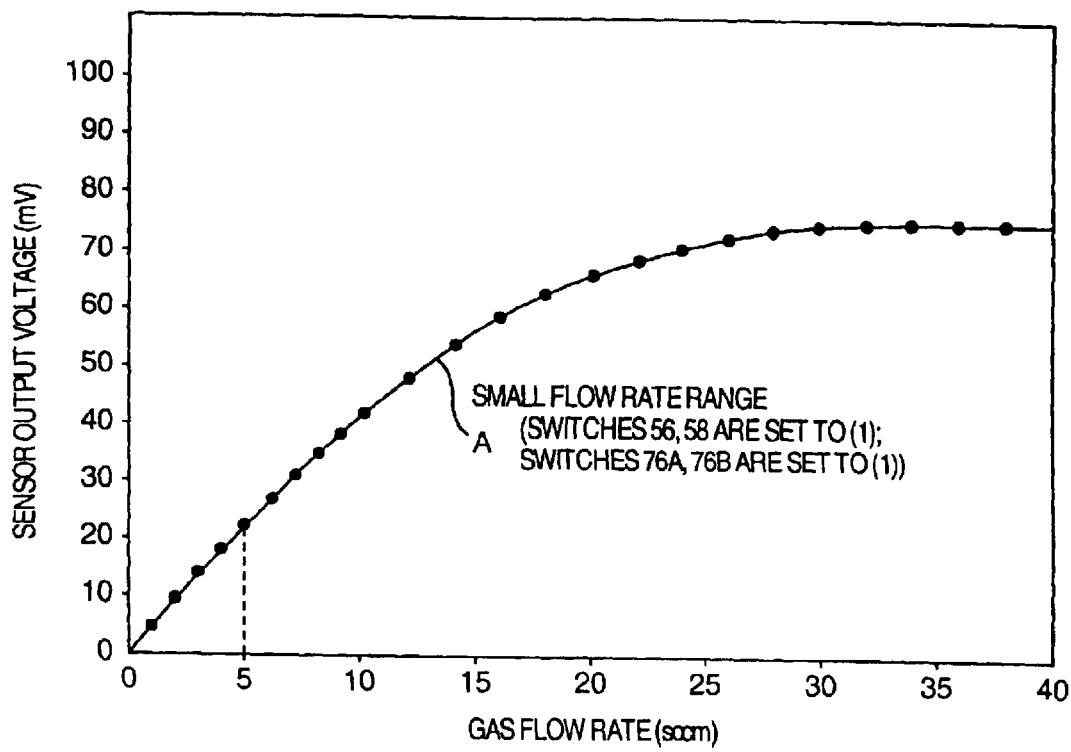
FIG. 4A and FIG. 4B are graphs showing the relationship between a gas flow rate and sensor output voltage (potential difference) in the second embodiment.
Figure 4B:
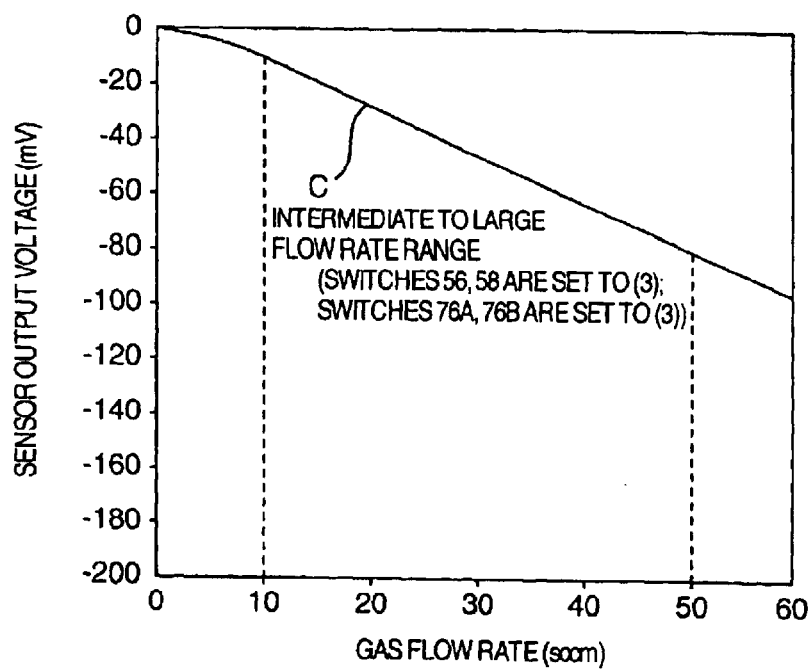

FIG. 4 is a graph showing the relationship between the gas flow rate and the sensor output voltage (potential difference) according to the second embodiment. FIG. 4A shows a graph of a small flow rate range and FIG. 4B shows a graph of an intermediate and large flow rate range.

<Small Flow Rate Range>

Firstly, explanation will be given on a case for detecting a flow rate in a small gas flow rate range (for example, in the order of 0 to 5 sccm).

In this case, the first selector switch 76A and the second selector switch 76B of the switch means 76, and the gain selector switch 58 are all switched to side (1). Thus, a constant current is flown by the constant current source 24 to the resistors R1 and R4 of the resistor group 64 and the reference resistors R5 and R6 of the reference resistor group 44. The circuit configuration at this time is identical to the conventional sensor shown in FIG. 18.

Moreover, at this time, a constant current is flown by the for-dummy constant current source 72 to the dummy resistors R1' and R4' of the dummy resistor group 68 and the dummy reference resistors R7 and R8 of the dummy resistor group 70 so as to heat them for measurement preparation but not used here for flow rate measurement.

The relationship between the gas flow rate and the sensor output at this time is as shown by a curve A in FIG. 4A, which is identical to the characteristic curve of curve A in FIG. 2. Accordingly, it is possible to accurately measure the gas flow rate in the small flow rate range in the order of, for example, 0 to 5 sccm.

<Intermediate to Large Flow Rate Range>

Next, explanation will be given on the flow rate detection in the intermediate to large gas flow rate range (for example, in the order of 10 to 50 sccm).

In this case, the first selector switch 76A and the second selector switch 76B of the switch means 76, and the gain selector switch 58 are all switched to side (3). Thus, the resistor group 64 is connected to the dummy resistor group 68 in series. Accordingly, a constant current is flown by the for-dummy constant current source 72 to the resistors R1 and R4 and the dummy resistors R1' and R4'.

The potential difference $Vs_3$ between the connection point between the resistor R4 and the dummy resistor R1' and the connection point between the dummy reference resistors R7 and R8 is obtained by the flow rate range increase differential circuit 74 and this is multiplied by the gain of the gain device 60C to obtain the flow rate value. It should be noted that as has been explained above, the gas fluid is flown in the sensor pipe 14 while no gas fluid is flown in the dummy sensor pipe 66. The relationship between the gas flow rate and the sensor output (potential difference) at this time is shown as a curve C in FIG. 4B.

As is clear from this graph, as the gas flow rate increases, the sensor output increases in one direction. In this case, as can be seen from the curve C, when the gas flow starts, linearity of the characteristic curve is not so preferable but after this, the linearity of the characteristic curve is fairly preferable. When the gas flow rate further increases, the sensor output is saturated. Accordingly, the range where the characteristic curve is especially preferable is an intermediate to a large flow rate in the order of 10 to 50 sccm. In this range, it is possible to measure the gas flow rate with a high accuracy.

Figure 5:
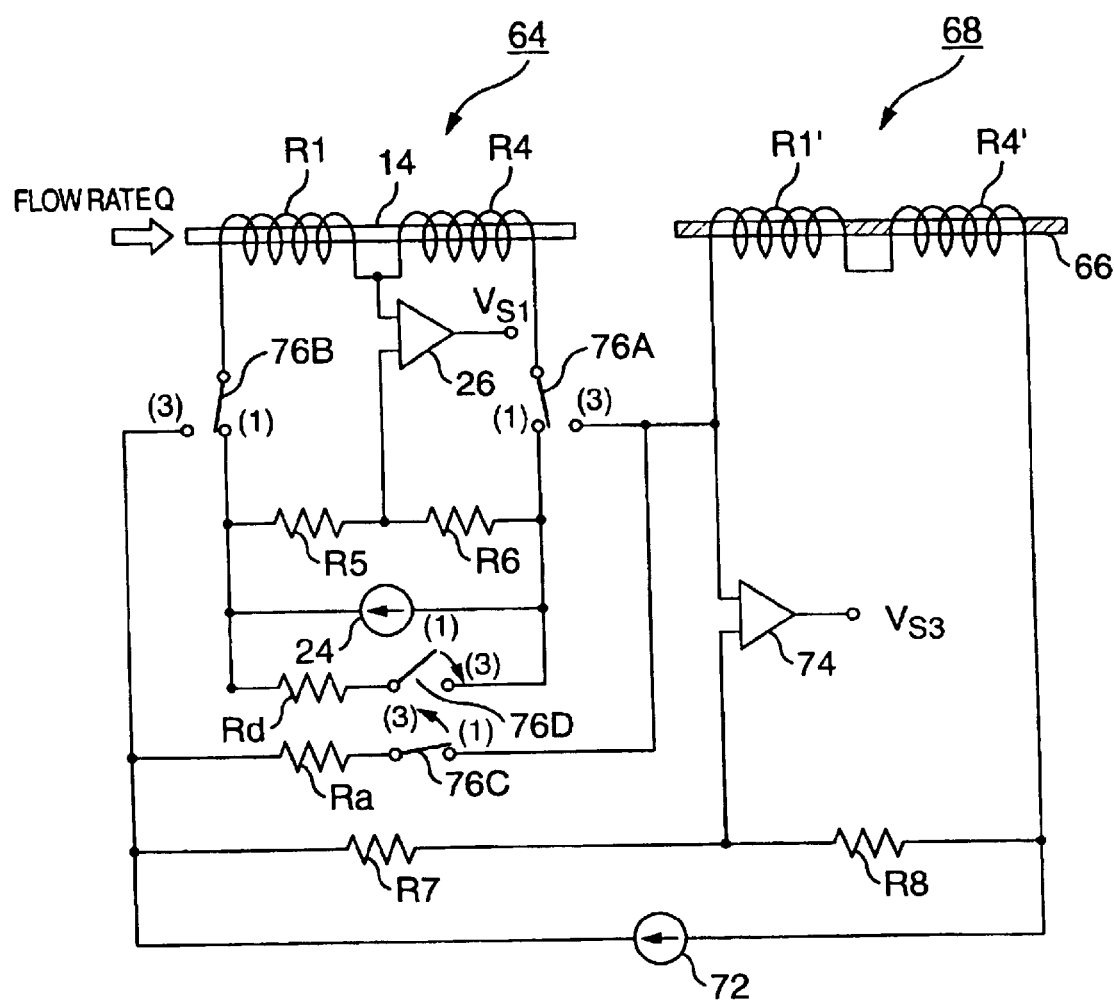
FIG. 5 is a circuit diagram as a modified example of the second embodiment.

It should be noted that the aforementioned second embodiment may be modified as shown in FIG. 5. In FIG. 5, like components as in FIG. 3 are denoted by like reference symbols and their explanations are omitted. Moreover, configuration of the differential circuit 26 and the flow rate increase differential circuit 74 and after is omitted.

Here, a first selector switch 76A is used to directly switch between the constant current source 24 side and the flow rate increase differential circuit 74 side. An open/close switch 76C is connected in series to the aforementioned buffer resistor Ra and this is further connected directly to the flow rate increase differential circuit 74 side. On the other hand, a second selector switch 76B is arranged at the resistor R1 of the uppermost side of the sensor pipe 14 and the current input side, so that here switching is performed between the side of the reference resistor R5 and the constant current source 24 and the side of the buffer resistor Ra, the dummy reference resistor R7, and the for-dummy constant current source 72. Moreover, a series circuit consisting of a protection resistor Rd and an open/close switch 76D is connected in parallel to the constant current source 24.

The aforementioned open/close switch 76C is closed at (1) and opened at (3) in the figure. On the contrary, the open/close switch 76D is opened at (1) and closed at (3) in the figure. Here, when the first and the second selector switch 76A and 76B are contact with (3), this open/close switch 76D is set to (3) to be turned ON. Thus, current is applied to the protection resistor Rd to prevent flowing of excessive current to the reference resistors R5 and R6 so as to protect the resistors.

The other switching of the first and the second selector switch 76A and 76B is shown by (1) and (3). The switching is performed in the same way as has been explained with reference to FIG. 3. In this modified embodiment also, the operation is performed in the same way as has been explained with reference to FIG. 3.

<Embodiment 3>

Description will now be directed to a third embodiment of the present invention.

Figure 6:
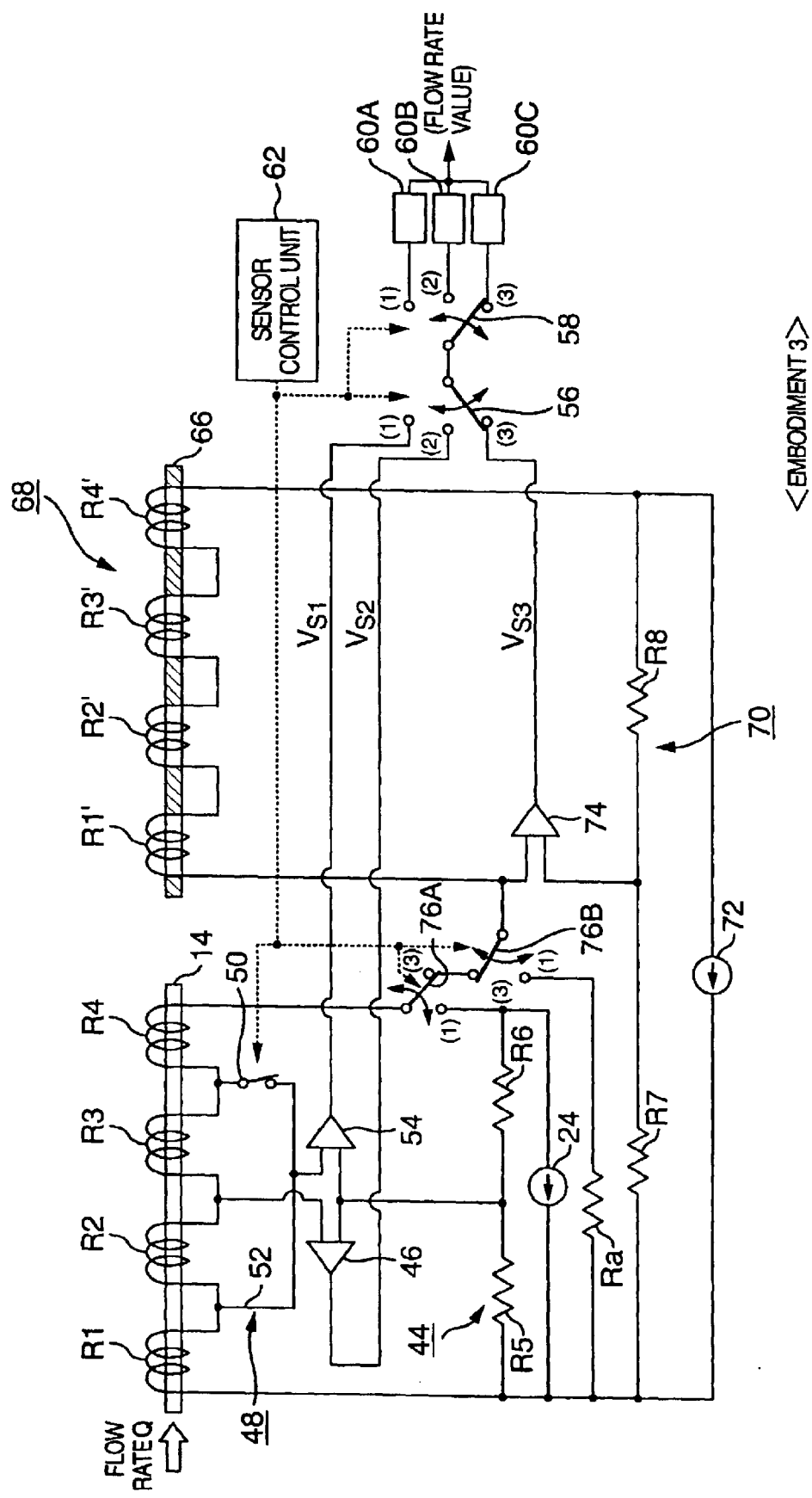
FIG. 6 is a circuit diagram showing an essential portion of a flow rate sensor according to a third embodiment of the present invention.

FIG. 6 is a circuit diagram showing an essential portion of the flow rate sensor according to the third embodiment of the present invention. It should be noted that like components as in FIG. 1 and FIG. 2 are denoted by like reference symbols and their explanations are omitted.

The third embodiment is a combination of the first embodiment and the second embodiment. Since four resistors R1 to R4 are used, four dummy resistors R1', R2', R3', and R4' having an identical resistance value are connected in series to constitute a dummy resistor group 68. It should be noted that in order to suppress the detection error by causing change with time in the same way, it is preferable to use the four dummy resistors R1' to R4' having the identical structure to the four resistors R1 to R4. However, the invention is not limited to this. It is also possible to use a single dummy resistor having a resistance equivalent to the total of the four dummy resistors R1' to R4' instead of the four dummy resistors R1' to R4'.

Moreover, since switching to three flow rate ranges is enabled, the output selector switch 56 and the gain selector switch 58 are three-point switches capable of selecting three points. It should be noted that the three-point switch is switched by the sensor control unit 62 and actually switched by software by a computer.

Next, explanation will be given on the operation of the aforementioned sensor with reference to a graph of FIG. 7.

Figure 7A:
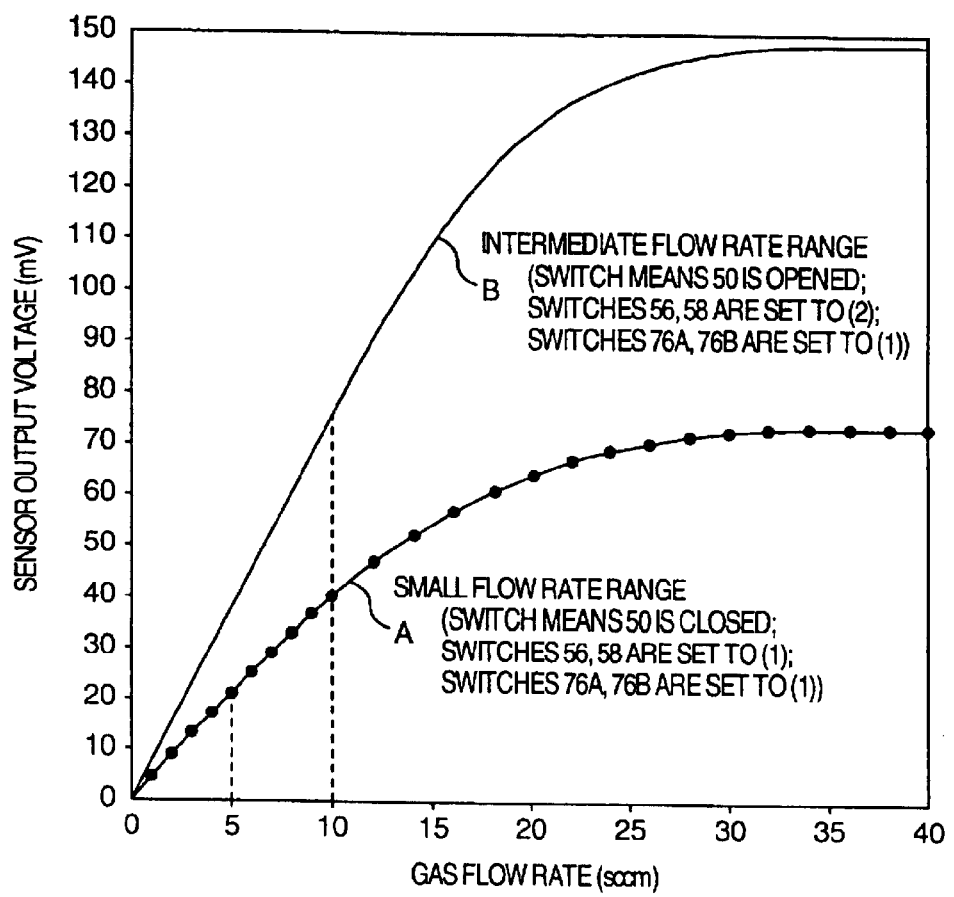
FIG. 7A and FIG. 7B are graphs showing the relationship between a gas flow rate and sensor output voltage (potential difference) in the third embodiment.

FIG. 7 is a graph showing the relationship between the gas flow rate and the sensor output voltage (potential difference) according to the third embodiment. FIG. 7A is a graph showing the small flow rate range and the intermediate flow rate range while FIG. 7 shows the large flow rate range.

<Small Flow Rate Range>

Firstly, explanation will be given on the florw rate detection in the small gas flow rate range (for example, in the order of 0 to 5 sccm).

In this case, the switch means 50 is set to the closed state and the first selector switch 76A and the second selector switch 76B of the switch means 76, the output selector switch 56, and the gain selector switch 58 are switched to side (1). Thus, it is possible to perform flow rate measurement by using the resistors R1 and R4. The relationship between the gas flow rate and the sensor output at this time is shown by the curve A inn FIG. 7A. This characteristic curve is identical to the curve A in FIG. 2. Accordingly, it is possible to measure the gas flow rate in the small flow rate range in the order of 0 to 5 sccm with a high accuracy.

<Intermediate Flow Rate Range>

In the case of the intermediate flow rate range, the switch means 50 is set to the open state and the output selector switch 56 and the gain selector switch 58 are moth set to side (2) while the first selector switch 76A and the second selector switch 76B are set to side (1).

Thus, it is possible to perform a flow rate measurement by using the resistors R1, R2, R3, and R4. The relationship between the gas flow rate and the sensor output at this time is shown by the curve B in FIG. 7A. This is the characteristic curve identical to the curve B in FIG. 2. Accordingly, it is possible to measure the gas flow rate in the intermediate flow rate range in the order of 5 to 10 sccm.

<Large Flow Rate Range>

In the case of the large flow rate range, the switch means 50 is maintained at the open state and the first selector switch 76A, the second selector switch 76B, the output selector switch 56, and the gain selector switch 58 are all switched to side (3).

Thus, it is possible to perform a flow rate measurement by using the resistors R1, R2, R3, R4 and the dummy resistors R1' to R4'. The relationship between the gas flow rate and the sensor output at this time is shown by the curve C in FIG. 7B. This is substantially a characteristic curve identical to the curve C in FIG. 4B. However, in this case, the number of resistors and the dummy resistors is increased from two to four. Accordingly, as compared to FIG. 4B, a larger flow rate range can be measured. Accordingly, it is possible to measure the gas flow rate in the large flow rate range in the order of 10 to 100 sccm.

<Embodiment 4>

Description will now be directed to a fourth embodiment of the present invention.

Figure 8:
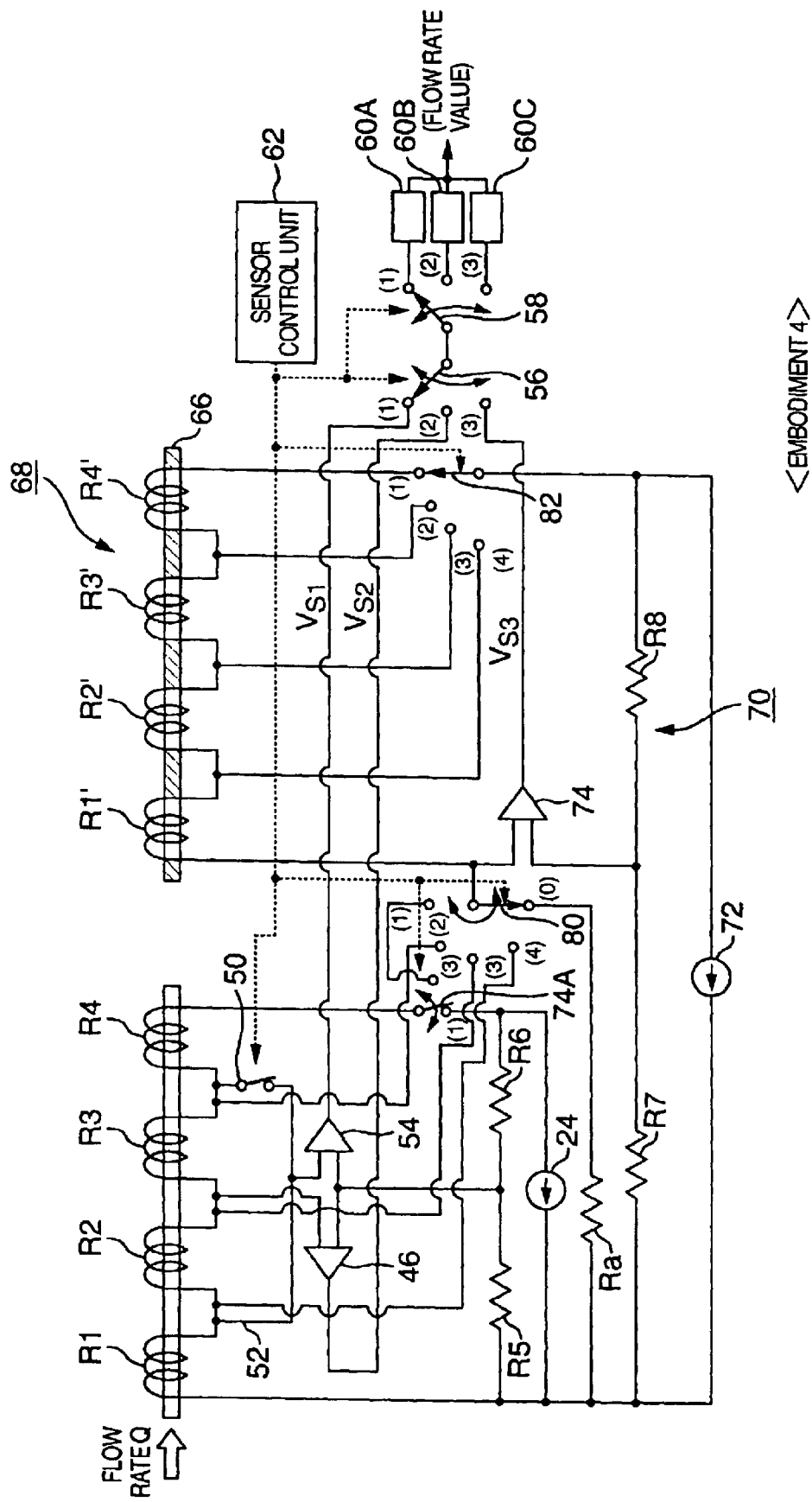
FIG. 8 is a circuit diagram showing an essential portion of a flow rate sensor according to a fourth embodiment of the present invention.

FIG. 8 is a circuit diagram showing an essential portion of the flow rate sensor according to the fourth embodiment. This fourth embodiment is a modified example of the third embodiment shown in FIG. 6 and is characterized in enlargement of the circuit configuration when using the dummy resistor group 68 of the dummy sensor pipe 66 side for a flow rate measurement.

That is, in order to select connection points between adjacent resistors among the aforementioned resistors R1 to R4, a first switch 80 for selecting lines pulled out from the connection points is provided instead of the second selector switch 76B in FIG. 6. It should be noted that this selection branch includes the output line of the resistor R4 positioned at the lowermost stream.

Moreover, in order to select connection points between adjacent resistors among the dummy resistors R1' to R4', a second switch 82 for selecting lines pulled out from the connection points is provided at the output line of the lowermost dummy resistor R4'. It should be noted that this selection branch includes the output line of the dummy resistor R4'.

In the device having the aforementioned configuration, the flow rate measurement in the small flow rate range and the intermediate flow rate range can be performed as has been explained in FIG. 6. Here, the first and the second switch 80, 82 are connected to side (1).

In contrast to this, when performing a flow rate measurement in the large flow rate range, firstly, in the same way as the third embodiment, the switch means 50 is set to the open state and the first selector switch 76A is switched to side (3). The first switch 80 and the second switch 82 are synchronized and switched to (1) to (4) when necessary so as to select a connection point, thereby performing a flow rate measurement in various flow rate ranges. For example, when the switches 80 and 82 are both connected to side (1), the resistors R1 and R1' are used. When the switches 80 and 82 are connected to side (2), resistors R1, R2, and R1', F2' are used. When the switches 80 and 82 are connected to side (3), resistors R1 to R3, and R1' to F3' are used. When the switches 80 and 82 are connected to side (4), resistors R1 to R4, and R1' to F4' are used.

It should be noted that when the switches 80 and 82 are connected to side (4), a flow rate measurement is performed in a large flow rate range as has been explained in FIG. 6.

<Embodiment 5>

Description will now be directed to a fifth embodiment of the present invention.

FIG. 9 is a circuit diagram showing an essential portion of the flow rate sensor according to the fifth embodiment of the present invention. This fifth embodiment is a flow rate sensor to be applied to flow rate control of a large flow rate range. It should be noted that like components as in the embodiments which have been explained are denoted by like reference symbols.

Here, a main resistor 90 is wound on the sensor pipe 14. The main resistor 90 changes its resistance according to the temperature and changes its heat value according to the flowing current. This main resistor 90 is made from a material identical to that of the resistors R1 to R4. This main resistor 90 is connected to a constant current source 24 for flowing a constant current to it. The both ends of the main resistor 90 are connected to a differential circuit 92 for obtaining voltage applied to it. Moreover, the fifth embodiment has reference value detection means 94 capable of obtaining a reference value according to the ambient temperature of the space where the flow rate sensor is placed. The reference value detection means 94 uses a dummy sensor pipe shown in FIG. 10 (explained later) and has a detection unit 96 composed of a thermistor, a thermocouple, temperature measuring resistor, or the like, so that a signal corresponding to the ambient temperature (atmosphere temperature) is output as a voltage.

Moreover, the reference value detection means 94 has a coefficient matching unit 98 for matching the ambient temperature characteristic of a voltage value corresponding to the ambient temperature detected by the detection unit 96 with the ambient temperature characteristic of voltage of the both ends of the main resistor 90 when no fluid is flown to the sensor pipe. The compensation characteristic for matching the coefficients is measured in advance and stored in the coefficient matching unit 98.

First flow rate detection means 100 is connected to the output side of the differential circuit 92 and the output side of the reference detection means 94, so that the flow rate of the fluid flowing in the flow passage 6 (see FIG. 17) is obtained according to these outputs. The first flow rate detection means 100 includes a differential circuit 102 and a flow rate measuring unit 104 for converting (calculating) to voltage (flow rate value) according to the actual flow rate by multiplying the output value of the differential circuit 102 by a gain, thereby outputting a voltage value corresponding to the flow rate value.

Here, the operation of the flow rate sensor is similar to the operation of the so-called large flow rate range explained with reference to FIG. 3 and FIG. 5. That is, when a gas fluid flows in the sensor pipe 14, the gas fluid absorbs heat and the temperature of the main resistor 90 is lowered, thereby lowering the resistance. Accordingly, the voltage at the both ends of the main resistor 90 is gradually reduced. The voltage applied to the main resistor 90 is compared to the output value (reference value) Vst1 of the reference value detection means 94 by the differential circuit 102 of the first flow rate detection means 100. The output value of the differential circuit 102 is multiplied by a predetermined gain or the like, so as to output the fluid flow rate value as voltage. Here, as has been described above, a voltage value output from the reference value detection means 94 is based on the ambient temperature.

Figure 7B:
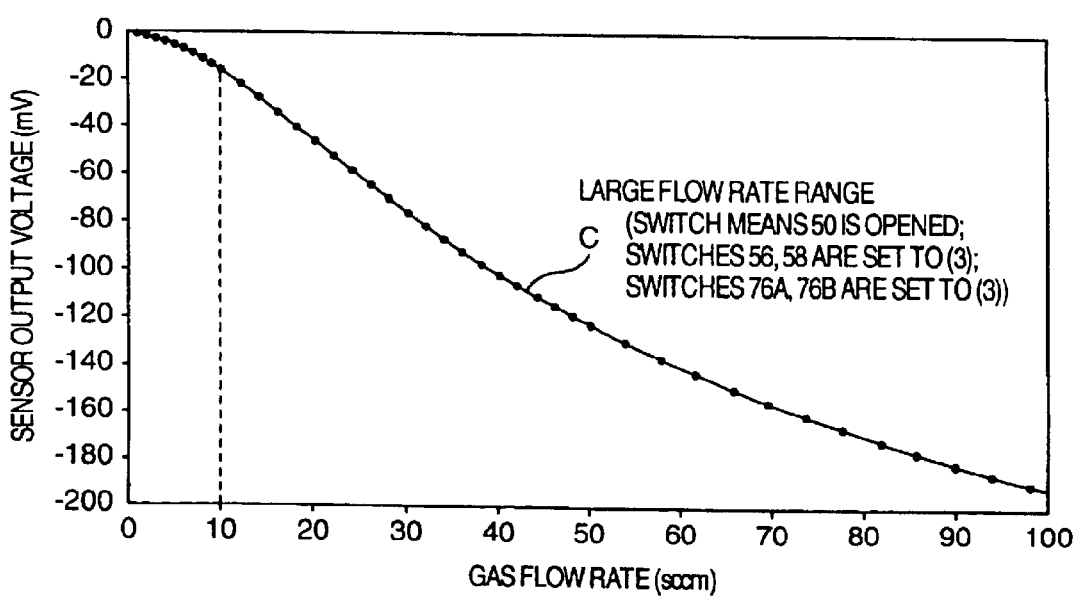

As shown in FIG. 4B and FIG. 7B, the characteristic curve of the gas flow rate and the sensor output voltage represents a characteristic curve of the so-called large flow rate range. In FIG. 4B and FIG. 7B, the sensor output voltage increases in the negative direction. This is simply inversion of the polarity. More specifically, as shown by the characteristic curve C in FIG. 12, as the gas flow rate increases, the sensor output voltage gradually increases, drawing a slow curve. This increase continues until the temperature of the main resistor 90 matches with the gas temperature. Accordingly, within the flow rate control range (full scale) that can be controlled by the flow rate sensor, it is possible to detect the flow rate in the maximum flow rate range with a high accuracy.

It should be noted that here, explanation has been given on a case using a thermistor or the like as the reference value detection means 94. However, instead of this, it is possible to store the voltage value of the main resistor 90 in a memory, so that the stored value is used as a reference value in actual flow rate control.

<Embodiment 6>

Figure 10:
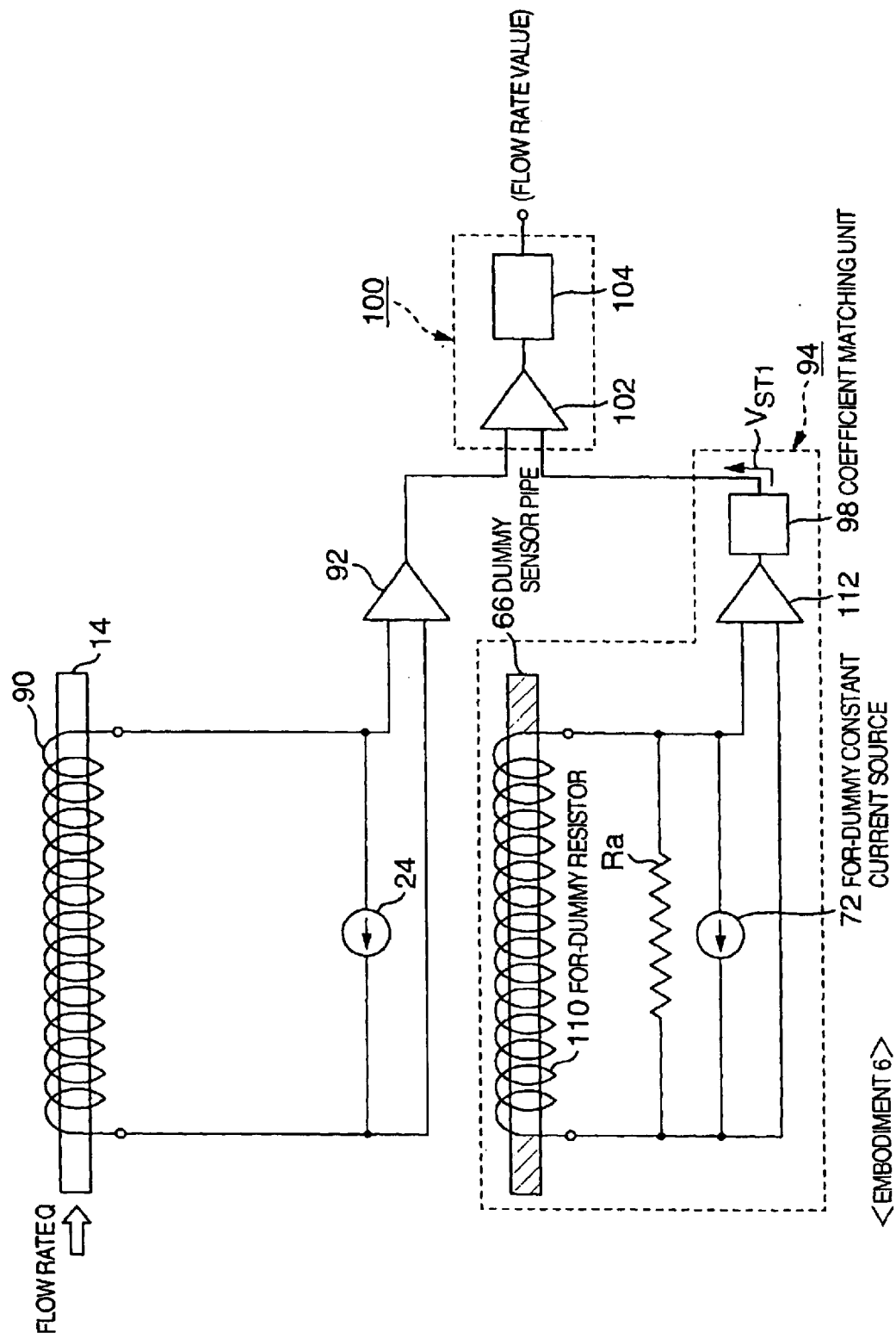
FIG. 10 is a circuit diagram showing an essential portion of a flow rate sensor according to a sixth embodiment of the present invention.

FIG. 10 is a circuit diagram showing an essential portion of a flow rate sensor according to a sixth embodiment of the present invention. In the sixth embodiment, a dummy sensor pipe 66 is used as the reference value detection means 94 in the fifth embodiment. It should be noted that like components as in the embodiments explained above are denoted by like reference symbols. Moreover, like components as in FIG. 9 are denoted by like reference symbols and their explanations are omitted.

As shown in FIG. 10, this flow rate sensor has the dummy sensor pipe 66 where no fluid is flown as the reference value detection means 94. A for-dummy resistor 10 changing its resistance value according to the temperature and heat value according to the flowing current is wound on this dummy sensor pipe 66.

The for-dummy resistor 110 has both ends connected to a for-dummy constant current source 72 for flowing a constant current to it. This for-dummy constant current source 72 is connected in parallel to a buffer resistor Ra. Furthermore, the both ends of the for-dummy resistor 110 are connected to a for-dummy voltage detection unit 112 composed of, for example, a differential circuit for detecting the voltage at the both ends as a reference value, so as to detect a voltage applied to the for-dummy resistor 110. This for-dummy voltage detection unit 112 is connected to a coefficient matching unit 98 containing a compensation coefficient for matching the resistance temperature coefficients of the main resistor 90 and the for-dummy resistor 110. A voltage value obtained according to the compensated resistance temperature coefficient is output as the reference value Vst1.

Explanation will be given on the compensation of the resistance temperature coefficient. The voltage value is calculated by an expression "a·Ed+b" by the coefficient matching unit 98. Here, "Ed" is the voltage at the both ends of the for-dummy resistor 110 and "a" and "b" are constants used to match the resistance temperature coefficients of the main resistor 90 and the for-dummy resistor 110. They are measured in advance and decided. Accordingly, the reference value detection means 94 using the dummy sensor pipe 66 always outputs the reference value Vst1 obtained depending on the ambient temperature.

In this case also, the operation characteristic obtained is similar to the one explained for the flow rate sensor shown in FIG. 9. Accordingly, in the flow rate control range (full scale) that can be controlled by this flow rate sensor, it is possible to detect the flow rate in the maximum flow rate range with a high accuracy.

<Embodiment 7>

Description will now be directed to a seventh embodiment.

Figure 11:
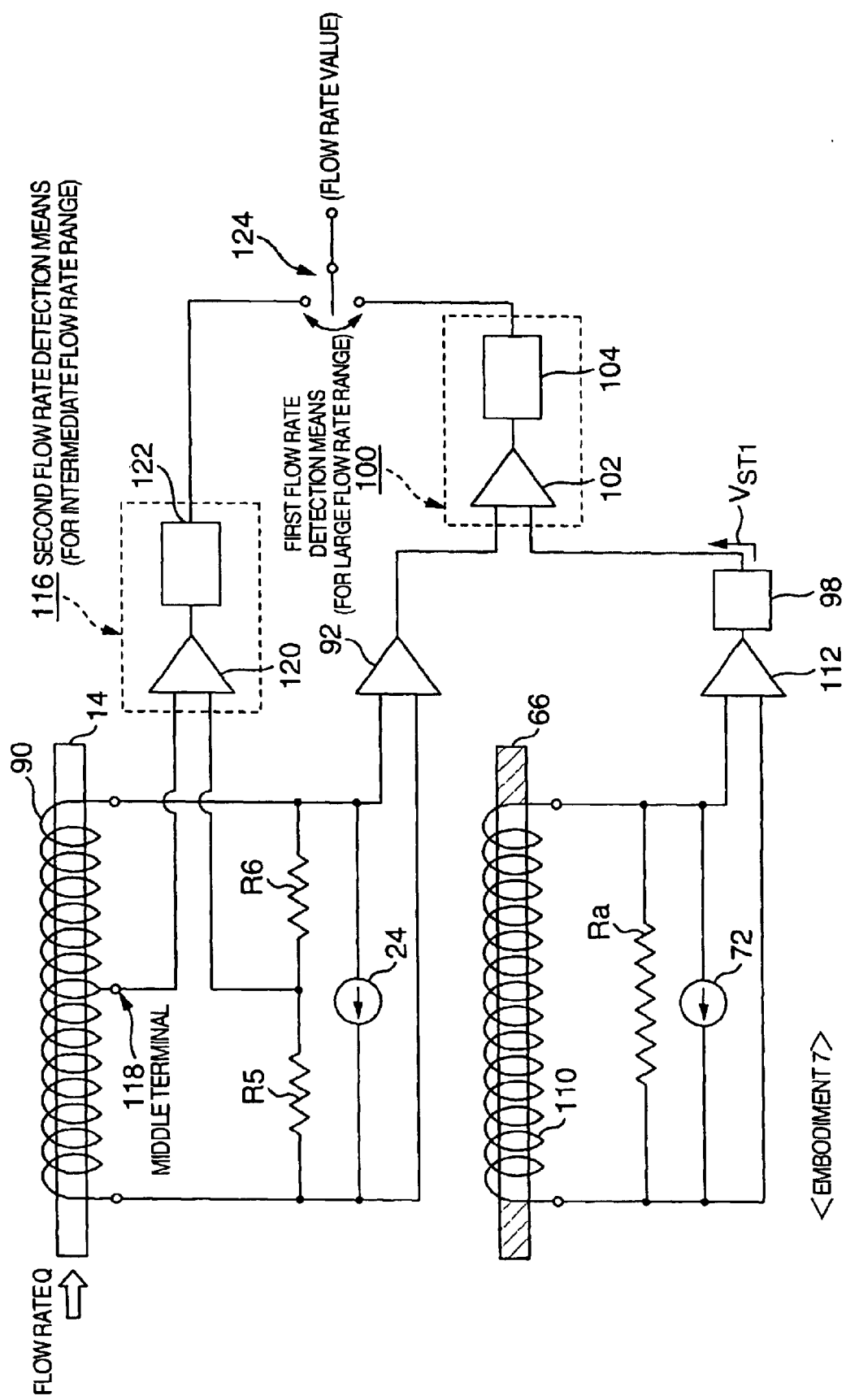
FIG. 11 is a circuit diagram showing an essential portion of a flow rate sensor according to a seventh embodiment of the present invention.

FIG. 11 is a circuit diagram showing an essential portion of a flow rate sensor according to the seventh embodiment of the present invention. The seventh embodiment is a combination of the sixth embodiment and flow rate detection means for the intermediate flow rate range. In this point, this embodiment is similar to the invention explained with reference to FIG. 3 and FIG. 5. It should be noted that like components as in the embodiments which have been explained above are denoted by like reference symbols. Moreover, like components as in FIG. 9 are denoted by like reference symbols and their explanations are omitted.

As shown in FIG. 11, this flow rate sensor is a combination of the flow rate sensor explained in FIG. 10 and second flow rate detection means 116 as flow rate detection means for the so-called intermediate flow rate range. That is, a middle terminal 118 is provided to extract voltage at an arbitrary position of the main resistor 90 in its longitudinal direction. The middle terminal 118 may be arranged at any position in the longitudinal direction of the main resistor 90 and is not limited to the middle point. Thus, the interval between the upstream end of the main resistor and the middle terminal 118 corresponds to the resistor R1 in FIG. 3, for example, while the interval between the middle terminal 118 and the downstream end of the main resistor 90 corresponds to the resistor R4 in FIG. 3. The both ends of the main resistor 90 are connected in parallel to the two reference resistors R5 and R6 connected in series, thereby forming a bridge circuit. Moreover, second flow rate detection means 116 is provided to obtain a flow rate of the fluid flowing in the flow passage 6 (see FIG. 17) by calculating a difference between the voltage applied to the upstream side of the main resistor as compared to the middle terminal 118 ad the voltage applied to the downstream side of the main resistor 90 as compared to the middle terminal 118. More specifically, the second flow rate detection means 116 includes a differential circuit 120 for comparing the potential of the middle terminal 118 and the potential of the connection point between the reference resistors R5 and R6 and calculates the difference (potential difference) and a flow rate calculator 122 for converting the output value of the differential circuit 120 into a voltage value (flow rate value) corresponding to the actual flow rate by multiplying the output value by a gain or the like. Thus, a voltage value corresponding to the flow rate is output.

Furthermore, switch means 124 is provided at the output side of the flow rate calculator 122 of the second flow rate detection means 116 and at the output side of the flow rate calculator 104 of the first flow rate detection means 100 so that these two outputs are selectively extracted.

Figure 12:
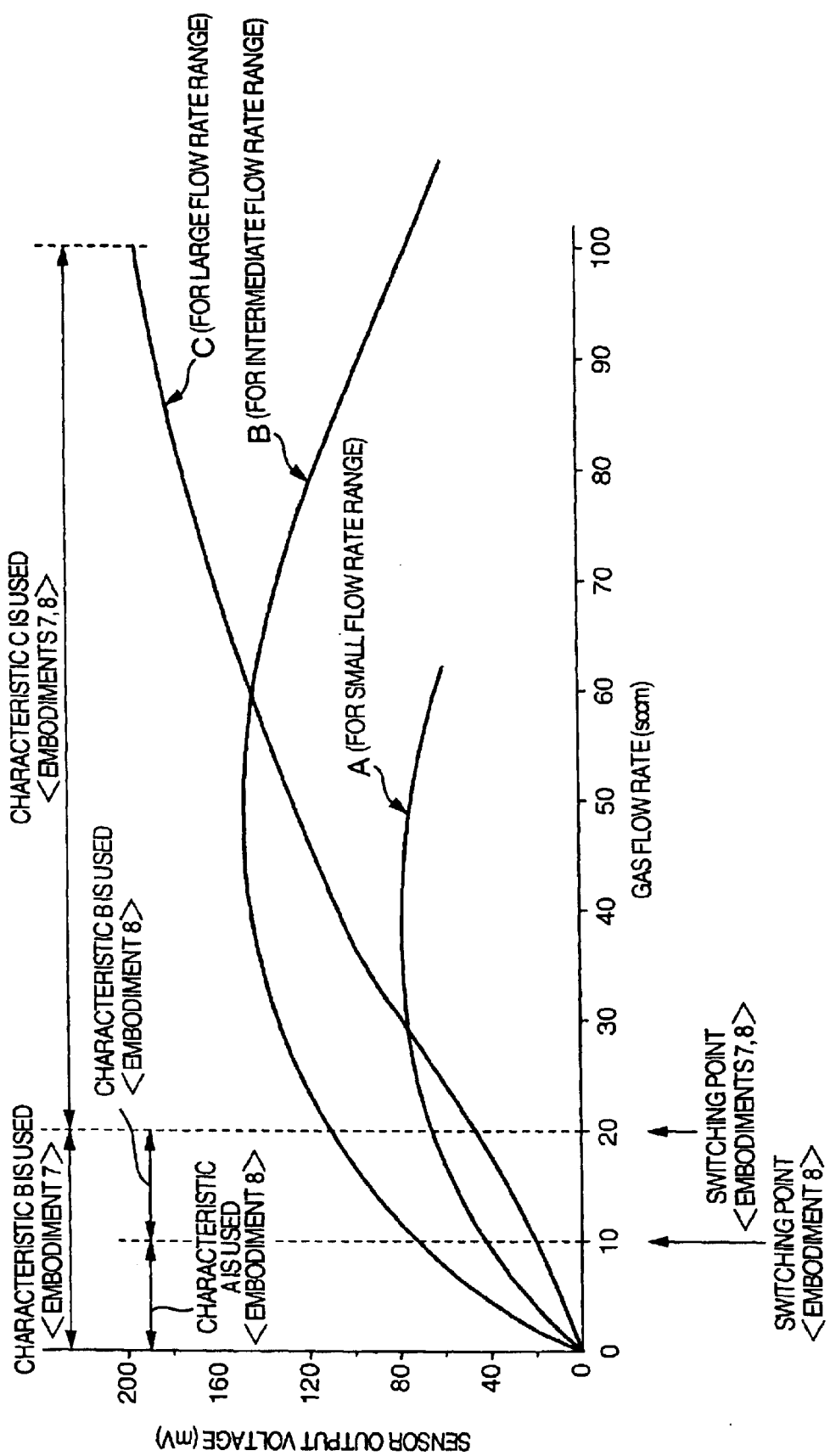
FIG. 12 is a graph showing the relationship between a gas flow rate and sensor output voltage (potential difference) in the seventh embodiment.

The flow rate sensor having the aforementioned configuration exhibits characteristic similar to the characteristic curves shown in FIG. 2, FIG. 4, and FIG. 7. More specifically, the flow rate sensor shows the characteristic shown in FIG. 12. FIG. 12 is a graph showing a relationship between a gas flow rate and a sensor output voltage (potential difference) of the seventh embodiment. Here, the characteristic curve B shows a characteristic curve as an output from the second flow rate detection means (for the intermediate flow rate range) and the characteristic curve C shows a characteristic curve as an output from the first flow rate detection means (for the large flow rate range). It should be noted that the characteristic curve A is a characteristic curve of an eight embodiment which will be explained later. Moreover, the characteristic curve C is shown here with the reversed polarity (positive) as compared to the case shown in FIG. 4 and FIG. 7.

The graph shown in FIG. 12 is set to show a flow rate of 100 sccm at full scale. The characteristic curve B shows that as the gas flow rate increases, the sensor output voltage gradually increases from zero and after passing the peak, gradually decreases, thereby forming a slow protrusion upward. In contrast to this, the characteristic curve C shows that as the gas flow rate increases, the sensor output voltage gradually increases, drawing a slow curve.

With such characteristics, the characteristic curve B has a comparatively high measurement accuracy in the small gas flow rate range, i.e., in the order of 0 to 20 sccm but its measurement accuracy is significantly lowered in the region above 20 sccm.

In contrast to this, the characteristic curve C has a measurement accuracy not so high as the characteristic curve B in the small gas flow rate range (for example, 0 to 20 sccm) but has a higher accuracy than the characteristic curve B in the region above 20 sccm. Accordingly, for example, a point of the gas flow rate of 20 sccm is set as the switching point of switch means 124, so that the characteristic curve B is used when the gas flow rate is below 20 sccm and the characteristic curve C is used when the gas flow rate is above 20 sccm. Thus, it is possible to increase the range capable of detecting the fluid flow rate with a high accuracy.

<Embodiment 8>

Description will now be directed to an eight embodiment.

FIG. 13 is a circuit diagram showing an essential portion of a flow rate sensor according to an eighth embodiment of the present invention. This eighth invention is a combination of the seventh embodiment and a flow rate detection means for the small flow rate range. In this point, this embodiment is similar to the inventions of FIG. 6 and FIG. 8. It should be noted that like components as in the embodiments explained above are denoted by like reference symbols. Moreover, like components as in FIG. 11 are denoted by like reference symbols and their explanations are omitted.

As shown in FIG. 13, this flow rate sensor is a combination of the flow rate sensor explained in FIG. 11 and third flow rate detection means 130 as flow rate detection means for the small flow rate range. That is, firstly, at an arbitrary point between the upstream side end of the main resistor 90 and the middle terminal 118, an upstream side terminal 132 is provided for extracting the voltage. Furthermore, at an arbitrary point between the downstream side end of the main resistor 90 and the middle terminal 118, a downstream side terminal 134 is provided for extracting the voltage. Thus, the main resistor 90 is divided into four portions in its longitudinal direction. For example, the four portions correspond to the resistors R1, R2, R3, and R4 from the left to right in FIG. 6.

A differential circuit 136 is provided to detect voltage applied between the upstream side end of the main resistor 90 and the upstream side terminal 132. Furthermore, a differential circuit 138 is provided to detect voltage applied between the upstream side end of the main resistor 90 and the downstream side terminal 132. Thus, it is possible to obtain voltage at the both ends of the resistor portions R1 and R4. Moreover, third flow rate detection means 1130 is provided to calculate the flow rate of the fluid flowing in the flow passage 6 (see FIG. 17) by detecting the difference between the voltages applied to the resistor portions R1 and R4. More specifically, the third flow rate detection means 130 includes a differential circuit 140 for comparing the output of the differential circuit 136 and the output of the differential circuit 138 so as to obtain a difference (potential difference) and a flow rate calculation unit 142 connected to the output side of the differential circuit 140 for multiplying the output value of the differential circuit 140 by a predetermined gain or the like, thereby converting (calculating)

the output into a voltage value (flow rate value) corresponding to the actual flow rate. Thus, a voltage value corresponding to the flow rate value is output.

Furthermore, switch means 144 is connected to the output side of the flow rate calculation unit 142 of the third flow rate detection means 130 and the to the output sides of the first and the second flow rate detection means 100, 116, so as to selectively extract the three outputs.

In the flow rate sensor having the aforementioned configuration, the outputs of the first and the second flow rate detection means 100, 116 become like the characteristic curve C and the characteristic curve B in FIG. 12 as has been described above, and the output of the third flow rate detection means 130 becomes like the characteristic curve A in FIG. 12. That is, the length of the main resistor 90 used in the third flow rate detection means 130 is substantially half of the length of the main resistor 90 used in the second flow rate detection means 116. Accordingly, the characteristic curve A is smaller than the characteristic curve B by about half and similar to B, drawing a slow protrusion upward. In this case, the characteristic curve C has a very high accuracy in the first half (higher accuracy of the flow rate than the characteristic curve B). For example, the switch means 144 may be switched at the position of about 10 sccm.

Accordingly, in this eighth embodiment, for example, the characteristic curve A is used for flow rate control in the range of 0 to 10 sccm (small flow rate range), the characteristic curve B is used for flow rate control in the range of 10 to 20 sccm (intermediate flow rate range), and the characteristic curve C is used for flow rate control in the range of 20 to 100 sccm (large flow rate range). It should be noted that the small, intermediate, and large flow rate range values given are merely examples and they are not limited to these values.

<Embodiment 9>

Description will now be directed to a ninth embodiment.

FIG. 14 is a circuit diagram showing an essential portion of a flow rate sensor according to the ninth embodiment of the present invention. The ninth embodiment corresponds to the eighth embodiment non having the dummy sensor pipe 66, the for-dummy resistor 110, and the first flow rate detection means (for the large flow rate range) 100. That is, the flow rate measurement portion for the large flow rate range is omitted. Accordingly, the second and the third flow rate detection means 116, 130 are provided so as to control flow rate of the intermediate and small flow rate range with a high accuracy.

<Embodiment 10>

Description will now be directed to a tenth embodiment.

FIG. 15 is a circuit diagram showing an essential portion of a flow rate sensor according to the tenth embodiment of the present invention. The tenth embodiment uses a constant temperature type flow rate sensor disclosed, for example, in JP 1-227016. In this constant temperature type flow rate sensor, the flow rate is measured by using a power difference instead of potential difference. Here, explanation will be given on a example of using the constant temperature type flow rate sensor in the seventh embodiment shown in FIG. 11. It should be noted that like components as in FIG. 11 are denoted by like reference symbols and their explanations are omitted.

As shown in FIG. 15, the both ends of the main resistor 90 is connected to a constant temperature control circuit 150 for maintaining the temperature of the main resistor 90 or the difference of this temperature and the ambient temperature constant, and as has been described above, the temperature of the main resistor 90 is maintained. The constant temperature control circuit 150 is, for example, disclosed in JP 1-227016.

Moreover, between the upstream side end of the main resistor 90 and middle terminal 118 arranged in the longitudinal direction of the main resistor 90, an upstream side power detection unit 152 is arranged for detecting power applied to the upstream side portion of the main resistor 90. On the other hand, between the downstream side end of the main resistor 90 and the middle terminal 118, a downstream side power detection unit 154 is arranged for detecting power applied to the downstream side portion of the main resistor 90.

Fourth flow rate detection means 156 for the so-called intermediate flow rate is arranged for detecting the flow rate of the fluid flowing in the fluid passage 6 (see FIG. 17) according to a difference between the powers of the upstream side and downstream side power detection units 152, 154. More specifically, the fourth flow rate detection means 156 includes a differential circuit 158 for comparing the upstream side power detected by the upstream side power detection unit 152 and the downstream side power detected by the downstream side power detection unit 154 so as to calculate a difference (power) and a flow rate calculation unit 160 connected to the output side of the differential circuit 158 for multiplying the output value of the differential circuit 158 by a predetermined gain or the like so as to convert (calculate) the output into the voltage value (flow rate value) corresponding to the actual flow rate.

Moreover, at the both ends of the main resistor 90, an all-power detection unit 162 is arranged for detecting the power applied to the entire main resistor 90. It should be noted that instead of using this all-power detection unit 162, it is possible to add (total) the output of the upstream side power detection unit 152 and the output of the downstream side power detection unit 154.

Furthermore, this embodiment includes reference value detection means 166 for detecting a reference value according to the ambient temperature. As this reference value detection means 166, it is possible to use a thermistor, a thermocouple, or a temperature measurement resistor as has been explained in the fifth embodiment with reference to FIG. 9. Here, explanation will be given on a case using the dummy sensor pipe 66 and a for-dummy resistor 110 (see FIG. 11).

The dummy sensor pipe 66 is wound around the for-dummy resistor 110 whose both ends ate connected to a for-dummy constant temperature control circuit 170 for maintaining the temperature of the for-dummy resistor 110 constant or for maintaining the difference between this temperature and the ambient temperature constant, so that the temperature of the for-dummy resistor 110 is controlled as has been described above. Moreover, the both ends of the for-dummy resistor 110 are connected to a for-dummy power detection unit 172 for detecting the power applied to the entire resistor so as to serve as a the aforementioned reference value. A coefficient matching unit 98 connected to the output side of the for-dummy power detection unit 172 contains a compensation coefficient for matching the resistance temperature coefficients of the main resistor 90 and the for-dummy resistor 110 and a voltage value calculated according to the compensated resistance temperature coefficient is output as the reference value Vst1.

Moreover, fifth flow rate detection means 174 for the so-called large flow rate range is provided for detecting the flow rate of the fluid flowing in the fluid passage 6 (see FIG. 17) according to the difference (power difference) between the output of the all-power detection unit 162 and the output of the coefficient matching unit 98. More specifically, the fifth flow rate detection means 174 includes a differential circuit 176 for comparing the power detected by the all-power detection unit 162 and the power detected by the for-dummy power detection unit 172 and compensated by the coefficient matching unit 98 before being output as the reference value Vst1, so as to calculate a difference (power) and a flow rate calculation unit 178 connected to the output side of the differential circuit 176 for multiplying the output value of the differential circuit 176 by a predetermined gain or the like so as to convert (calculate) the output into a voltage value (flow rate value) corresponding to the actual flow rate. Thus, a voltage value corresponding to the flow rate value is output. Switch means 124 is connected to the output side of the flow rate calculation unit 178 of the fifth flow rate detection means 174 and the output side of the flow rate calculation unit 160 of the fourth flow rate detection means 156, so that these two outputs are selectively extracted.

The flow rate sensor having the aforementioned configuration can exhibit the same function and effect as the seventh embodiment shown in FIG. 11.

The invention for detecting a flow rate according to power consumption (power applied) consumed by the main resistor 90 and the whole or a part of the dummy resistor 110 instead of using voltage applied to them can be applied to the eighth embodiment shown in FIG. 13 and the ninth embodiment shown in FIG. 14.

<Embodiment 11>

Figure 16A:
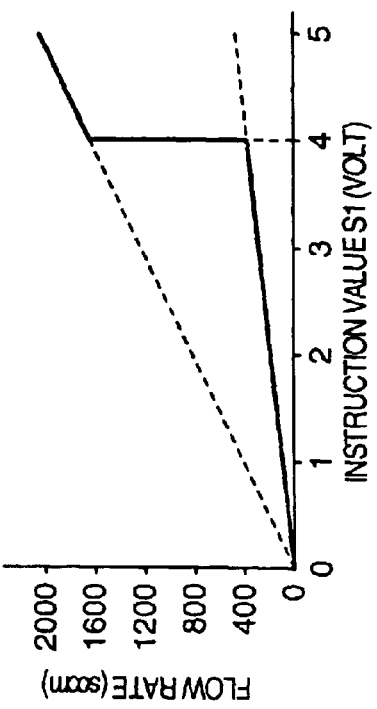
FIG. 16A, FIG. 16B, FIG. 16C, and FIG. 16D are graphs showing the relationship between an instruction value (voltage) and a flow rate.

As has been described above, the instruction value S1 (see FIG. 17) associated with the gas flow rate from the device controller is sent in the range of 0 to 5V and this voltage value corresponds to the flow rate. For example, as shown in FIG. 16A, when the maximum gas flow rate (full scale) is set to 200 sccm, the relationship between the control flow rate and the instruction value (voltage) S1 is rectilinear. Accordingly, when control is performed in the flow rate range of about 100 sccm, voltage of the instruction value S1 changes around 0.25V. When the flow rate is controlled in the order of 2000 sccm, the instruction value S1 changes around 5V. Here, when controlling the instruction value S1 to about 0.25V in order to control the flow rate in the range of about 100 sccm, the instruction value S1 is changed even if a slight noise is input, which may significantly fluctuate the control flow rate. Besides, in the actual semiconductor device, there is little cases of using a single flow rate control device for the entire range of 0 to 2000 sccm. There is often a case that the flow rate control is performed in partial ranges of, for example, 50 to 100 sccm and 1900 to 2000 sccm.

In such a case, for example, the range of 0 to 4V of the instruction value S1 may correspond to the flow rate range of 0 to 100 sccm while the range of 4 to 5V of the instruction value may correspond to the flow rate range of 1600 to 2000 sccm. That is, discontinuity may be present in the flow rate control characteristic. In this case, the instruction value S1 having the characteristic as shown in FIG. 16B is output and the gains of the flow rate calculation units 104, 122, 142 in the above embodiments are adjusted in advance to obtain the output value based on the characteristic as shown in FIG. 16B.

Thus, when switching a plurality of flow rate ranges for performing flow rate control, it is possible to increase the resolution of the small flow rate range or the intermediate flow rate range, thereby further improving the flow rate control accuracy.

Figure 16B:
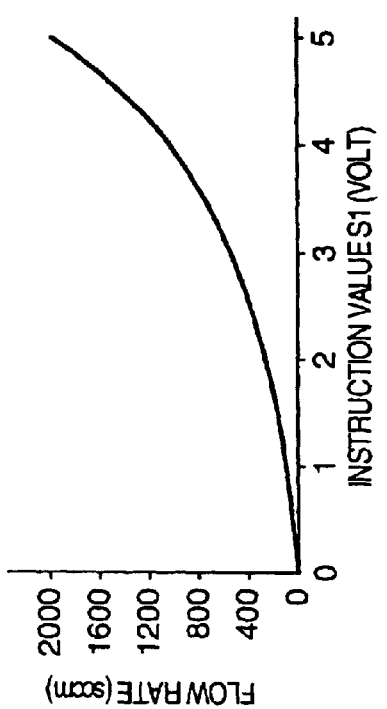
Figure 16C:
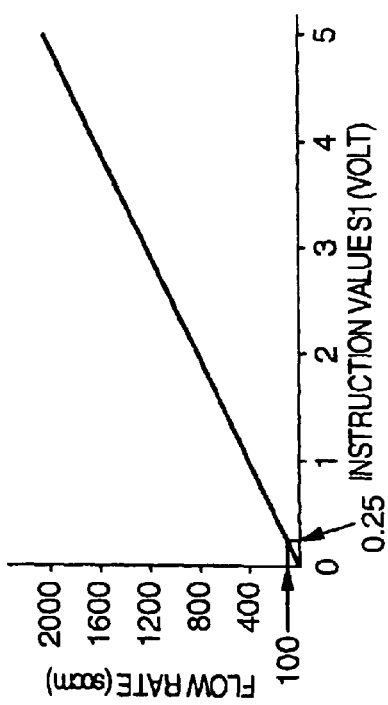

Such a characteristic switching is not limited to the characteristic of FIG. 16B but may be as shown in FIG. 16C. That is, the flow rate control characteristic has a flexion point so that the instruction value S1 of voltage value 0 to 4V corresponds to the flow rate range of 0 to 100 sccm and the instruction value S1 of voltage value 4 to 5V corresponds to the flow rate range of 400 to 2000 sccm.

Figure 16D:
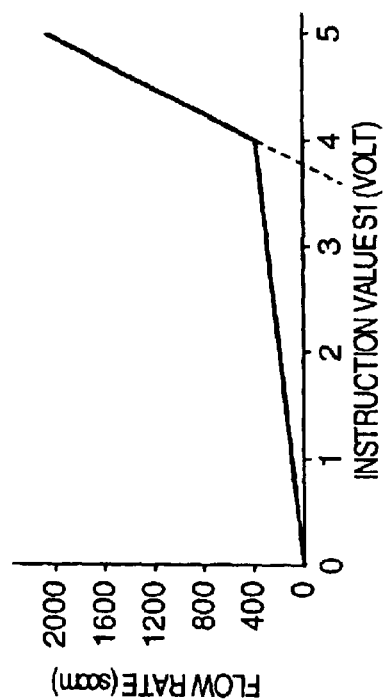

Furthermore, as shown in FIG. 16D, the flow rate control characteristic may have LOG characteristic with a plurality of scales of flow rate in the vertical axis.

It should be noted that explanation has been given on the flow rate sensors of the respective embodiments. When the sensor is used as a flow rate measurement device, it is possible to additionally use display means such as a display for displaying the flow rate value obtained in each sensor. Moreover, when the aforementioned sensors are used as the flow rate control devices (mass flow rate control devices), they can be used as the flow rate sensor 5 of the flow rate control device 2 shown in FIG. 17.

Moreover, the flow rate ranges used in the respective embodiments are only examples. By selecting resistors and resistance values of the resistors used, it is possible to perform a flow rate measurement or flow rate control with a high accuracy.

Moreover, the switches, differential circuits, and resistors in the respective embodiments can be formed as semiconductor integrated circuits.

As has been explained above, according to the present invention, it is possible to provide a flow rate sensor and a flow rate measurement device capable of increasing the range where the fluid flow rate can be detected with a high accuracy.

Moreover, it is possible to provide a flow rate control device capable of increasing the range of controlling the fluid flow rate with a high accuracy.

Moreover, it is possible to accurately detect a flow rate in the maximum flow rate range within the fluid flow rate control range (full scale).

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A flow rate sensor comprising:
   a sensor pipe arranged in parallel to a bypass of a fluid passage;
   a resistor group spirally wound around the sensor pipe and consisting of an even number of resistors having a resistance value changing according to the temperature and connected in series in the longitudinal direction of the sensor pipe;
   a reference resistor group consisting of a plurality of reference resistors connected in series to one another and connected in parallel to the aforementioned resistor group;
   a constant current source for flowing a constant current to the resistor group and the reference resistor group;
   a first differential circuit for detecting a potential difference between a connection point between the reference resistors and a connection point between the resistors; and
   a flow rate decision unit for deciding a flow rate of a fluid flowing in the fluid passage according to the potential difference output from the first differential circuit;
   the flow rate sensor further comprising:
   at least one bypass circuit having switch means for selectively shortcircuiting a part of the even number of resistors so as to perform bypassing;

at least one flow rate range increasing differential circuit for detecting a potential difference between the bypass circuit and the connection point between the reference resistors; and a second flow rate decision unit for detecting the flow rate of the fluid flowing in the fluid passage according to the potential difference output from the flow rate range increasing differential circuit.

2. A flow rate sensor as claimed in claim 1, wherein there are provided four of the resistors and two of the reference resistors, and the bypass circuit bypasses the two resistors connected in series at the center.

3. A flow rate sensor as claimed in claim 1, the sensor further comprising:

a dummy sensor pipe where no fluid is flown;

a dummy resistor group consisting of one or more dummy resistors having a resistance value changing according to the temperature and mounted in the longitudinal direction of the dummy sensor;

a dummy reference resistor group connected between the downstream side of the dummy resistor group and the upstream side of the resistor group and consisting of a plurality of dummy reference resistors connected in series;

a for-dummy constant current source connected to the both ends of the dummy reference resistor group for flowing a constant current;

switch means for selectively connecting in series the resistor group and the dummy resistor group;

a flow rate range increasing differential circuit for detecting a potential difference between the input side of the dummy resistor group and the connection point between the dummy reference resistors; and a third flow rate decision unit for detecting the flow rate of the fluid flowing in the fluid passage according to the potential difference output from the flow rate range increasing differential circuit.

4. A flow rate sensor as claimed in claim 3, the sensor further comprising:

a first switch for selecting a connection point between the resistors and a second switch for selecting a connection point between the dummy reference resistors.

5. A flow rate measuring device comprising a flow rate sensor disclosed in claim 1 and a display unit displaying a flow rate obtained by the flow rate sensor.

6. A flow rate control device comprising:

a flow rate sensor disclosed in claim 1;

a flow rate control valve provided in a fluid passage; and an actuator controlling valve opening degree of the flow rate control valve according to an output value of the flow rate sensor.

7. A flow rate sensor comprising:

a sensor pipe arranged to bypass a bypass of a fluid passage;

a resistor group consisting of an even number of resistors having a resistance value changing according to the temperature, connected in series in the longitudinal direction of the sensor pipe, and mounted on the sensor pipe;

a reference resistor group consisting of a plurality of reference resistors connected in series to one another and connected in parallel to the aforementioned resistor group;

a constant current source for flowing a constant current to the resistor group and the reference resistor group;

a first differential circuit for detecting a potential difference between a connection point between the reference resistors and a connection point between the resistors; and a flow rate decision unit for deciding a flow rate of a fluid flowing in the fluid passage according to the potential difference output from the first differential circuit;

the flow rate sensor further comprising flow rate range increasing measurement means for increasing the flow rte range, the flow rate range increasing measurement means having:

a dummy sensor pipe where no fluid is flown;

a dummy resistor group consisting of one or more dummy resistors having a resistance value changing according to the temperature and mounted in the longitudinal direction of the dummy sensor;

a dummy reference resistor group connected between the downstream side of the dummy resistor group and the upstream side of the resistor group and consisting of a plurality of dummy reference resistors connected in series;

a for-dummy constant current source connected to the both ends of the dummy reference resistor group for flowing a constant current;

switch means for selectively connecting in series the resistor group and the dummy resistor group;

a flow rate range increasing differential circuit for detecting a potential difference between the input side of the dummy resistor group and the connection point between the dummy reference resistors; and a third flow rate decision unit for detecting the flow rate of the fluid flowing in the fluid passage according to the potential difference output from the flow rate range increasing differential circuit.

8. A flow rate measuring device comprising a flow rate sensor disclosed in claim 7 and a display unit displaying a flow rate obtained by the flow rate sensor.

9. A flow rate control device comprising:

a flow rate sensor disclosed in claim 7;

a flow rate control valve provided in a fluid passage; and an actuator controlling valve opening degree of the flow rate control valve according to an output value of the flow rate sensor.

10. A flow rate sensor comprising:

a sensor pipe connected in parallel to a bypass of a fluid passage;

a main resistor wound on the sensor pipe and changing its resistance value according to the temperature and heat value according to the current;

a constant current source for flowing a constant current to the main resistor;

reference value detection means capable of obtaining a reference value according to the ambient temperature; and first flow rate detection means for detecting the flow rate of the fluid flowing in the fluid passage according to the voltage applied to both ends of the main resistor and the reference value obtained by the reference value detection means.

11. A flow rate sensor as claimed in claim 10, wherein the reference value detection means comprises:

a dummy sensor pipe where no fluid is flown;

a for-dummy resistor wound on the dummy sensor pipe and changing its resistance value according to the temperature and its heat value according to the current flowing;

a for-dummy constant current source for flowing a constant current to the for-dummy resistor; and a for-dummy voltage detection unit for detecting voltage at both ends of the for-dummy resistor so as to serve as the reference value.

12. A flow rate sensor as claimed in claim 10, wherein the reference value detection means has a coefficient matching unit for matching the resistance temperature coefficients of the main resistor and the for-dummy resistor.

13. A flow rate sensor as claimed in claim 10, wherein the reference value detection means has one of a thermistor, a thermocouple, and a temperature measuring resistor for detecting the ambient temperature as a voltage value.

14. A flow rate sensor as claimed in claim 13, wherein the reference value detection means has a coefficient matching unit for matching the ambient temperature characteristic of the voltage value detected according to the ambient temperature with the ambient temperature characteristic of the voltage at both ends of the main resistor when no fluid is flown through the sensor pipe.

15. A flow rate sensor as claimed in claim 10, wherein the reference value detection means stores a voltage at both ends of the main resistor before starting flow of the fluid in the sensor pipe, so as to use the stored value as the reference value.

16. A flow rate sensor as claimed in claim 10, the sensor further comprising:

a middle terminal for extracting voltage at an arbitrary position of the main resistor;

second flow rate detection means for detecting the flow rate of the fluid flowing in the fluid passage by calculating the difference between the voltage of the upstream side of the main resistor as compared to the middle terminal and the voltage of the downstream side of the main resistor as compared to the middle terminal; and switch means for switching between the output of the second flow rate detection means and the output of the first flow rate detection means.

17. A flow rate sensor as claimed in claim 16, the sensor further comprising:

an upstream side terminal arranged at an arbitrary point between the upstream side end of the main resistor and the middle terminal;

a downstream side terminal arranged at an arbitrary position between the downstream side end of the main resistor and the middle terminal;

third flow rate detection means for detecting the flow rate of the fluid flowing in the fluid passage by calculating the difference between the voltage between the upstream side end and the upstream side terminal and the voltage between the downstream side end and the downstream side terminal; and switch means for selectively switching between the outputs of the first, the second, and the third flow rate detection means.

18. A flow rate sensor as claimed in claim 16, wherein each of the flow rate detection means has a flow rate calculation unit for adjusting a gain.

19. A flow rate sensor as claimed in claim 18, wherein the flow rate calculation units have different gains so that the flow rate control characteristic has a discontinuity point or a flexion point according to switching of the switch means.

20. A flow rate sensor as claimed in claim 18, wherein the flow rate calculation unit has a gain exhibiting LOG characteristic.

21. A flow rate measuring device comprising a flow rate sensor disclosed in claim 10 and a display unit displaying a flow rate obtained by the flow rate sensor.

22. A flow rate control device comprising:

a flow rate sensor disclosed in claim 10;

a flow rate control valve provided in a fluid passage; and an actuator controlling valve opening degree of the flow rate control valve according to an output value of the flow rate sensor.

23. A flow rate sensor comprising:

a sensor pipe arranged in parallel to a bypass of a fluid passage;

a main resistor wound on the sensor pipe and changing its resistance value according to the temperature and its heat value according to the current;

a constant current source for flowing a constant current to the main resistor;

a middle terminal for extracting voltage at an arbitrary position of the main resistor;

second flow rate detection means for obtaining the flow rate of the fluid flowing in the fluid passage by calculating the difference between the voltage of the upstream side of the main resistor as compared to the middle terminal and the voltage of the downstream side of the main resistor as compared to the middle terminal;

an upstream side terminal arranged at an arbitrary point between the upstream side end of the main resistor and the middle terminal;

a downstream side terminal arranged at an arbitrary point between the downstream side end of the main resistor and the middle terminal;

third flow rate detection means for obtaining the flow rate of the fluid flowing in the fluid passage by calculating the difference between the voltage between the upstream side end and the upstream side terminal and the voltage between the downstream side end and the downstream side terminal; and switch means for selectively switching between the outputs of the second and the third flow rate detection means.

24. A flow rate control device comprising:

a flow rate sensor disclosed in claim 23;

a flow rate control valve provided in a fluid passage; and an actuator controlling valve opening degree of the flow rate control valve according to an output value of the flow rate sensor.

25. A flow rate measuring device comprising a flow rate sensor disclosed in claim 23 and a display unit displaying a flow rate obtained by the flow rate sensor.

26. A flow rate sensor comprising:

a sensor pipe arranged in parallel to a bypass of a fluid passage;

a main resistor wound on the sensor pipe and changing its resistance value according to the temperature and its heat value according to the current;

a constant temperature control circuit for maintaining the temperature of the main resistor and the difference between the temperature and the ambient temperature to be constant;

a middle terminal for extracting voltage at an arbitrary position of the main resistor;

fourth flow rate detection means for obtaining the flow rate of the fluid flowing in the fluid passage by calculating the difference between the upstream side power applied to the upstream side of the main resistor as compared to the middle terminal and the downstream side power applied to the downstream side of the main resistor as compared to the middle terminal;

reference value detection means capable of detecting a reference value according to the ambient temperature;

fifth flow rate detection means for obtaining the flow rate of the fluid flowing in the fluid passage according to all the power applied to the main resistor and the reference value obtained by the reference value detection means; and switch means for selectively switching between the outputs of the fourth and the fifth flow rate detection means.

27. A flow rate sensor as claimed in claim 26, wherein the reference value detection means comprises:

a dummy sensor pipe where no fluid is flown;

a for-dummy resistor wound on the dummy sensor pipe and changing its resistance value according to the temperature and its heat value according to the current flowing;

a for-dummy constant temperature control circuit for maintaining the temperature of the for-dummy resistor or the difference between the temperature and the ambient temperature to be constant;

a for-dummy power detection unit for detecting power applied to the for-dummy resistor so as to serve as the reference value.

28. A flow rate sensor as claimed in claim 26, wherein the reference value detection means stores all the power applied to the main resistor before start of flowing of the fluid in the sensor pipe and uses the stored value as the reference value.

29. A flow rate sensor as claimed in claim 26, wherein each of the fourth and the fifth flow rate detection means has a flow rate calculation unit for adjusting the gain.

30. A flow rate sensor as claimed in claim 29, wherein the flow rate calculation units have different gains so that the flow rate control characteristic has a discontinuity point or a flexion point according to switching of the switch means.

31. A flow rate sensor as claimed in claim 29, wherein the flow rate calculation unit has a gain exhibiting LOG characteristic.

32. A flow rate measuring device comprising a flow rate sensor disclosed in claim 26 and a display unit displaying a flow rate obtained by the flow rate sensor.

33. A flow rate control device comprising:

a flow rate sensor disclosed in claim 26;

a flow rate control valve provided in a fluid passage; and an actuator controlling valve opening degree of the flow rate control valve according to an output value of the flow rate sensor.

* * * * *